(12) United States Patent
Shah et al.

(10) Patent No.: US 11,748,359 B2
(45) Date of Patent: *Sep. 5, 2023

(54) SYSTEMS AND METHODS FOR COHORT ANALYSIS USING COMPRESSED DATA OBJECTS ENABLING FAST MEMORY LOOKUPS

(71) Applicant: The Board of Trustees of the Leland Stanford Junior University, Stanford, CA (US)

(72) Inventors: Nigam H. Shah, Menlo Park, CA (US); Vladimir Polony, Novato, CA (US); Juan Manuel Banda, Mableton, GA (US); Alison Victoria Callahan, Oakland, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/645,569

(22) Filed: Dec. 22, 2021

(65) Prior Publication Data

US 2022/0188318 A1    Jun. 16, 2022

Related U.S. Application Data

(63) Continuation of application No. 16/610,440, filed as application No. PCT/US2018/030413 on May 1, 2018, now Pat. No. 11,210,296.
(Continued)

(51) Int. Cl.
   *G06F 16/2455* (2019.01)
   *G06F 16/22* (2019.01)
(Continued)

(52) U.S. Cl.
   CPC .... *G06F 16/24568* (2019.01); *G06F 16/2255* (2019.01); *G06F 16/2272* (2019.01); *G06F 16/254* (2019.01); *G06F 21/6245* (2013.01)

(58) Field of Classification Search
   CPC .......... G06F 16/24568; G06F 16/2272; G06F 16/2255; G06F 16/254; G06F 21/6245;
   (Continued)

(56) References Cited

U.S. PATENT DOCUMENTS 11,210,296 B2   12/2021   Shah et al.
2002/0128861 A1   9/2002   Lau et al.
(Continued)

FOREIGN PATENT DOCUMENTS

WO    2018204339 A1    11/2018

OTHER PUBLICATIONS

International Preliminary Report on Patentability for International Application PCT/US2018/030413, Report dated Nov. 5, 2019, dated Nov. 14, 2019, 6 Pgs.
(Continued)

*Primary Examiner* — Evan Aspinwall
(74) *Attorney, Agent, or Firm* — KPPB LLP

(57) ABSTRACT

Systems and methods for structuring unstructured data according to a data object structure that enables fast query look-ups across a variety of space and time dimensions. Furthermore, many embodiments optimize the storage of the data objects using a set of compression techniques that configure the data types used for the data objects based on properties of the stored data. Furthermore, many embodiments provide are able to service query look-up requests without having to deserialize data within the byte stream format as stored in memory by encoding information that
(Continued)

provide memory locations for requested data, thereby allowing for the immediate retrieval of the data as it is stored in the persistent memory.

18 Claims, 20 Drawing Sheets

Related U.S. Application Data

(60) Provisional application No. 62/492,779, filed on May 1, 2017.

(51) Int. Cl.
  *G06F 16/25* (2019.01)
  *G06F 21/62* (2013.01)

(58) Field of Classification Search
  CPC .... G06F 16/278; G06F 16/25; G06F 16/2465; G06F 16/24554; H04L 69/22
  USPC .......................................................... 707/769
  See application file for complete search history.

(56) References Cited

U.S. PATENT DOCUMENTS

| | | | |
|---|---|---|---|
| 2004/0087336 A1 | 5/2004 | Payrits et al. | |
| 2004/0103071 A1 | 5/2004 | Kalia et al. | |
| 2008/0134133 A1* | 6/2008 | DelloStritto | G16H 10/60 717/101 |
| 2009/0089078 A1* | 4/2009 | Bursey | G06Q 30/0281 382/293 |
| 2012/0110016 A1 | 5/2012 | Phillips | |
| 2014/0122099 A1 | 5/2014 | Triebel | |
| 2014/0122523 A1 | 5/2014 | Aggarwal et al. | |
| 2015/0142821 A1 | 5/2015 | Rassen et al. | |
| 2018/0089278 A1* | 3/2018 | Bhattacharjee | G06F 16/90335 |
| 2018/0089328 A1* | 3/2018 | Bath | G06F 16/22 |
| 2019/0138642 A1* | 5/2019 | Pal | G06F 16/2471 |
| 2019/0147084 A1* | 5/2019 | Pal | G06F 16/2471 707/769 |
| 2020/0057767 A1 | 2/2020 | Shah et al. | |

OTHER PUBLICATIONS

International Search Report and Written Opinion for International Application No. PCT/US2018/030413, Search completed Jul. 10, 2018, dated Aug. 2, 2018, 11 Pgs.

Horvath et al., "The DEDUCE Guided Query tool: Providing simplified access to clinical data for research and quality improvement", Journal of Biomedical Informatics, Apr. 2011, vol. 44, No. 2, pp. 266-276, https://doi.org/10.1016/j.jbi.2010.11.008.

Hripcsak et al., "Observational Health Data Sciences and Informatics (OHDSI): Opportunities for Observational Researchers", Studies in Health Technology and Informatics, 2015, vol. 216, pp. 574-578.

Hruby, "Toward a Generalized Model of Biomedical Query Mediation to Improve Electronic Health Record Data Retrieval", Columbia University, 2016, Thesis, 189 pgs., https://doi.org/10.7916/D8R49QZW.

Lowe et al., "STRIDE—An Integrated Standards-Based Translational Research Informatics Platform", AMIA Annual Symposium Proceedings Archive, Nov. 14, 2009, pp. 391-395.

\* cited by examiner

SYSTEMS AND METHODS FOR COHORT ANALYSIS USING COMPRESSED DATA OBJECTS ENABLING FAST MEMORY LOOKUPS

CROSS REFERENCE TO RELATED APPLICATIONS

This current application is a continuation of U.S. patent application Ser. No. 16/610,440, filed Nov. 1, 2019, entitled "Systems and Methods for Cohort Analysis Using Compressed Data Objects Enabling Fast Memory Lookups" to Shah et al., which is a national stage of PCT Patent Application No. PCT/US2018/030413, entitled "Systems and Methods for Cohort Analysis Using Compressed Data Objects Enabling Fast Memory Lookups" to Shah et al., filed May 1, 2018, which claims priority to U.S. Provisional Application No. 62/492,779, entitled "Systems and Methods for Cohort Analysis Using Compressed Data Objects Enabling Fast Memory Lookups" to Shah et al., filed May 1, 2017, the disclosures of which are incorporated by reference herein in their entirety.

FIELD OF THE INVENTION

The present invention is related to providing systems and methods for structuring unstructured data according to a data object structure that enables fast query look-ups across a variety of space and time dimensions. Furthermore, many embodiments optimize the storage of the data objects using a set of compression techniques that configure the data types used for the data objects based on properties of the stored data. Furthermore, many embodiments are able to service query look-up requests without having to deserialize data within the byte stream format as stored in memory by encoding information that provide memory locations for requested data, thereby allowing for the immediate retrieval of the data as it is stored in the persistent memory.

BACKGROUND

Most current approaches for identifying a cohort of patients use existing query language paradigms such as Structured Query Language (SQL) and repurpose an existing database system to search disparate medical data. These approaches result in a cohort building exercise that takes several days or weeks, and require the use of form based interfaces to generate the necessary structured query over the underlying data. Furthermore, the analysis of this data requires significant processing overhead as the data is often dispersed among numerous disparate database systems that does not enable a systematic approach for analyzing the data efficiently and according to the varying needs of different users.

SUMMARY OF THE INVENTION

Systems and methods for cohort analysis using compressed data objects in accordance with embodiments of the invention are disclosed. In one embodiment a system for data analysis, includes: a processor, and memory containing software, where the software directs the processor to: receive unstructured information from several sources related to an object; select a data type for at least one data object in several data objects that is optimal for encoding the unstructured information into the at least one data object based on properties of the object, where the at least one data object includes at least one header and several data components, where the at least one header includes information regarding the selected data type and memory mappings of the several data components within a body of the at least one data object; encode the unstructured information in the at least one data object of the selected data type, wherein the unstructured information is encoded within the several data components in a serialized in-memory byte-stream format; retrieve values from different data component of the at least one data object using the at least one header, where the values are retrieved in the serialized in-memory byte stream format.

In a further embodiment, the system further includes: receiving a search query; determining a memory location of a data value relevant to the search query; and retrieving the data value directly from a particular data component of the at least one data object using the header of the at least one data object to identify a memory location of the particular data component and without deserialization of the at least one data object, where the data value is retrieved in a serialized in-memory byte-stream format.

In another embodiment, serialization includes translating data objects into a byte-stream format for storage in memory and deserialization includes extracting a data structure from a series of bytes.

In a still further embodiment, selecting the data type for the data object includes minimizing a number of bytes used to store the data object.

In still another embodiment, selecting the data type for the data object is based on a total byte size of the data object and where different data objects have different data types.

In a yet further embodiment, information regarding the data type of the at least one data object is stored within the header of the at least one data object.

In yet another embodiment, different data objects have different sets of data components, and where the at least one header of the at least one data object identifies a series of data components available for the at least one data object.

In a further embodiment again, the at least one header includes an offset encoding and an offset for each of the several data components of the at least one data object.

In another embodiment again, the offset encoding specifies the encoding type used to store the offset for each of the several data components.

In yet another embodiment, an offset of a particular data component of a particular data object provides a number of bytes between a start of the particular data component in the particular data object body and a start of the particular data object in memory.

In another embodiment again the system further includes allocating a first set of data objects from the several data objects to off-heap memory and a second different set of data objects as on-disk shards, where an optimal shard size is determined based on a size of the data set.

In a further embodiment again, the system further includes storing the several data objects in a master-slave configuration that allows parallel processing of the data objects stored at different locations, where the master stores a first set of data objects and corresponding indices and statistics and the slave stores a remaining second set of data objects and corresponding indices and statistics.

In yet a further embodiment again, the system further includes generating a data index mapping the plurality of data objects to on-disk shards storing the plurality of data objects.

In still yet a further embodiment again, the system further includes generating a memory index that maps each data object in the several data objects to a memory space for fast data retrieval.

In still another further embodiment again, the system further includes processing the unstructured information using several data models that determine how to store the unstructured information in the at least one data object.

In a yet further additional embodiment again, the several data components have several different types, where a data component from the several data components is at least one type selected from the group consisting of a hashmap, a list, a measured value list, a computed value list.

In still yet another further embodiment again, a measured value list type data component includes a set of values and corresponding times for the values.

In yet another further embodiment again, the at least one data object is stored in a continuous memory byte range.

In another further embodiment again, the system further includes: receiving a search query in several dimensions including space and time; analyzing headers of the several data objects to identify a set of data objects relevant to the search query; and identifying memory locations of values relevant to the search query based on the headers of the set of data objects.

In a further embodiment again, the system further includes using an index to identify the set of data objects relevant to the search query.

In a yet further embodiment again, the object is a person and where the unstructured information is medical data related to the person.

BRIEF DESCRIPTION OF THE DRAWINGS

The description will be more fully understood with reference to the following figures and data graphs, which are presented as various embodiments of the disclosure and should not be construed as a complete recitation of the scope of the disclosure, wherein.

DETAILED DESCRIPTION

Figure 1:
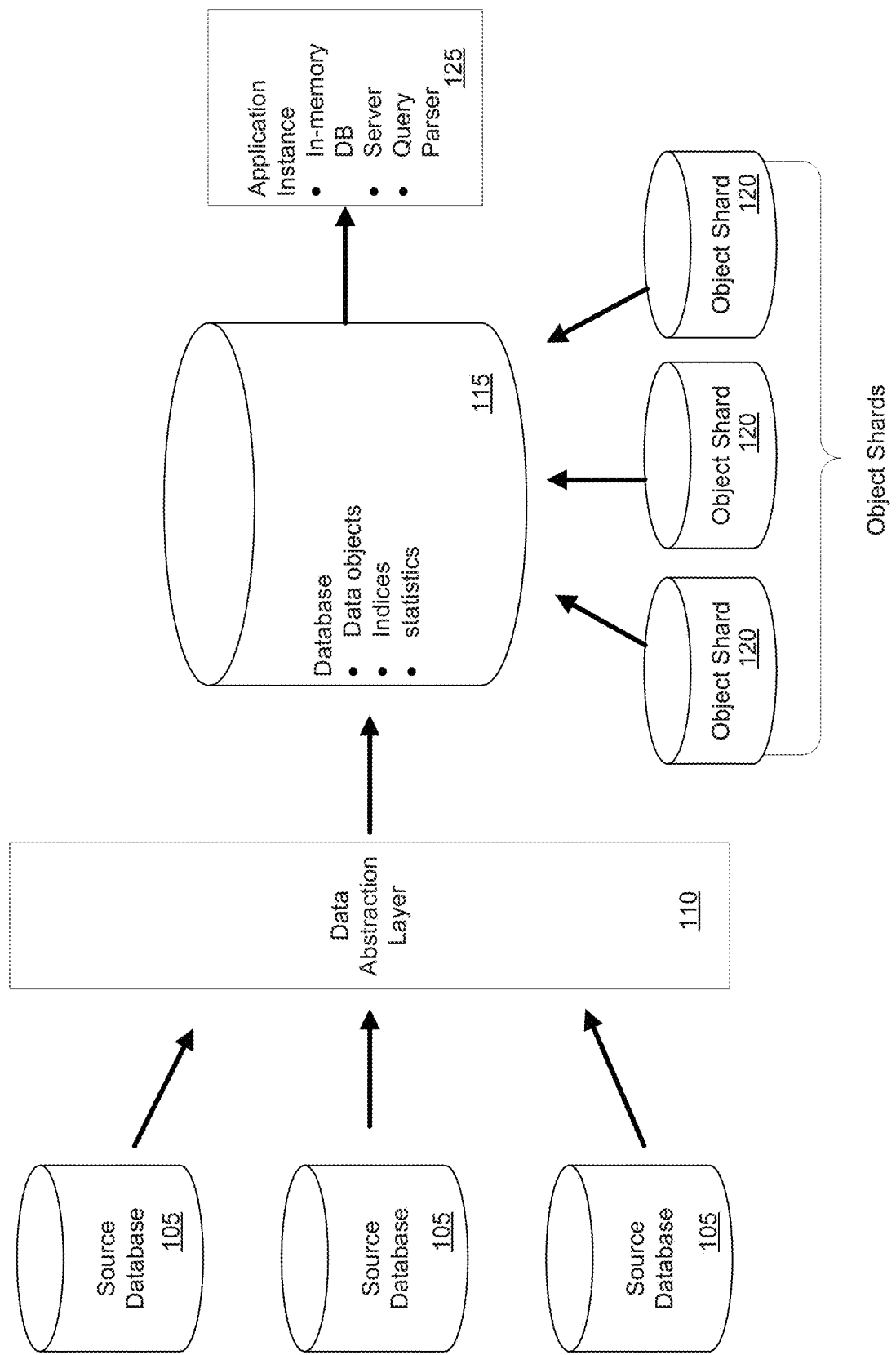
FIG. 1 conceptually illustrates a system for data extraction and compression in accordance with an embodiment of the invention.

Turning now to the drawings, systems and methods for structuring unstructured data in order to optimize storage and enable analysis and querying of the data across a variety of space and time dimensions in accordance with many embodiments of the invention are described. In several embodiments, the system structures the data in order to provide an "object-centric" paradigm whereby data related to a particular object is stored within a single "data object" data structure. Each data object may then be stored at a unique and continuous memory location within the system (as opposed to the data being dispersed across many different data structures and disparate memory locations), enabling the system to access all of the data related to an object within a particular continuous memory byte range. Furthermore, the structured data facilitates the execution of search queries across a variety dimensions in both space and time. In particular, many embodiments structure the data objects to organize data values in relation to their corresponding time values in order to facilitate queries that specify any of a variety of time and space constraints on the data. Thus, patterns of data occurring at particular times can be quickly identified and retrieved for further analysis.

In many embodiments, the data objects encode information that provide a memory mapping of the values contained within the data objects, enabling fast query lookups of this data while avoiding deserialization of the entire data objects from their in-memory byte stream format which significantly reduces processing times. In particular, in many embodiments, the data object may include one or more headers storing the various memory mappings, and a corresponding body that includes one or more data components mapped by the header, where each data component stores a different type of data value(s) related to the data object. For example, in the context of medical records, that data object may be a patient data object, and each data component of the data object may correspond to a particular medical data type, such as lab results, medications, vitals, among any of a variety of data components that may be utilized to arrange the patient data.

As noted, during the execution of a search query, the header of the data object may be used in order to immediately determine the exact memory location and/or memory offset of data values relevant to the search query. Furthermore, the system may use the data object header information to retrieve relevant data directly from the byte stream without having to deserialize the entire data object, thereby significantly reducing the processing overhead associated with accessing and retrieving the data in memory. Accordingly, the system may locate and analyze the values stored in the data components of a data object in their serialized in-memory byte-stream format in accordance with many embodiments of the invention.

In many embodiments, the system optimizes the storage of the data using a variety of encoding and compression techniques that minimize the number of bytes used to store data objects by encoding each data object according to a particular data type (e.g., BYTE, SHORT, LONG, DOUBLE, among various other data types as specified in for example, the JAVA programming language) that is optimal based on the properties of the data object. Accordingly, the data type used to encode each data object may be selected based on the actual data that is needed to be stored in the data object, which varies with each different data object, thereby optimizing the allocation of memory for each data object.

In particular, in many embodiments, the system determines the total byte size of a data object, which may vary for different data objects, and uses this byte size to determine the particular data type to use in order to encode and store the data object in memory, whereby different data types will allocate different amounts of storage based on the properties inherent to each particular data type (e.g., INT vs. DOUBLE). Likewise, the information regarding the data type being used to encode a particular data object may be stored within the metadata header of the data object, and used during the analysis of the data objects to determine the data types of the data components in the data object.

In several embodiments, the system provides a temporal query language search tool that can quickly search the persistent in-memory database of data objects and retrieve data values of relevant data and/or data objects as needed to satisfy a particular search query. The search tool can quickly analyze the data objects using the metadata information provided in the headers of the data objects to search along a variety of time and space dimensions.

In many embodiments, the system may be designed for use in the context of medical patient cohort identification and analysis, and the data objects may correspond to patient data objects. The system may be used to enable real-time search and analysis of this patient data for patient cohort identification and/or to provide a tool for real-time doctor-patient bed-side prognosis recommendations. In particular, by structuring the vast amounts of disparate patient data within a "patient-centric" patient data object, the system is able to avoid the prior laborious efforts that were otherwise needed to identify patient cohorts. These techniques often required weeks to months of time dedicated to structuring the appropriate search queries in order to obtain the relevant data. Thus, many embodiments provide a system that enables the immediate identification of patient cohorts that satisfy sophisticated search criteria in both time and space.

In the context of patient data, the headers of the patient data object may be used to identify the series of data components (e.g., labs, vitals, visits, among numerous other data) that are available for a particular patient object. Different patient data objects may include different data components based on the data available for each patient, and thus different patient data objects may be encoded using different encoding formats and data types. For example, a particular patient data object may not have any lab results while other patient data objects may have lab results, and thus each header of a patient object can be analyzed to quickly determine the types of data stored (e.g., patient with labs available vs. patient with no labs) within the various data components of each particular patient data object.

In many embodiments, the system includes different data structures, including (1) data objects, (2) statistics about the data objects, and (3) indices that map internal identifiers to external identifiers (e.g., external identifiers such as the International Classification of Diseases (ICD) codes) which can be used to search patient objects and statistics.

In many embodiments, the system may generate and utilize an identifier index that maps each internal identifier to its external identifier as it exists in untransformed data records, enabling efficient search. In several embodiments, the system may generate and utilize an index that links each internal identifier to the set of data objects with records containing the corresponding external identifier, enabling fast lookup.

In several embodiments, the system may use different types of data storage based on the environment in which it is deployed, including (1) off-heap memory, (2) cache, and (3) on-disk shards. In many embodiments, the proportion of data stored using each mechanism is configured based on the environment and resources available. In particular, if there is sufficient off-heap memory, then all the data objects may be stored in the off-heap memory. If there is not enough off-heap memory to store all the data objects, the system may store as much of the data objects as possible in available off-heap memory, and the rest as shards. In certain embodiments, the optimal shard size is determined at transformation time based on the size of the data set, to minimize the number of shards that need to be read from to access the entirety of a data object at query evaluation time.

In several embodiments, the system generates and utilizes a data index that maps each data object identifier to the shard it is stored in. In response to a query, the system may use the data index to determine the location of the required data. If the data is in a shard, the shard may be loaded into the cache memory and the data is retrieved from the cache.

In many embodiments, the system generates and utilizes a memory index that maps each data object identifier to its corresponding data object starting point in the memory space, such that the data can be retrieved directly without deserialization or copying of the data objects, enabling fast query response times. Systems for enabling fast lookup and analysis of data objects in accordance with many embodiments of the invention are discussed in detail below.

Overview of System Architecture as Applied to Patient Data

In order to enable immediate data lookup capabilities as well as the ability to execute search queries across a variety of space and time dimensions, many embodiments of the invention provide a system that extracts unstructured data from a variety of sources, structures the data such that it is organized for immediate identification and retrieval, and compresses the data to minimize the storage requirements.

Figure 2:
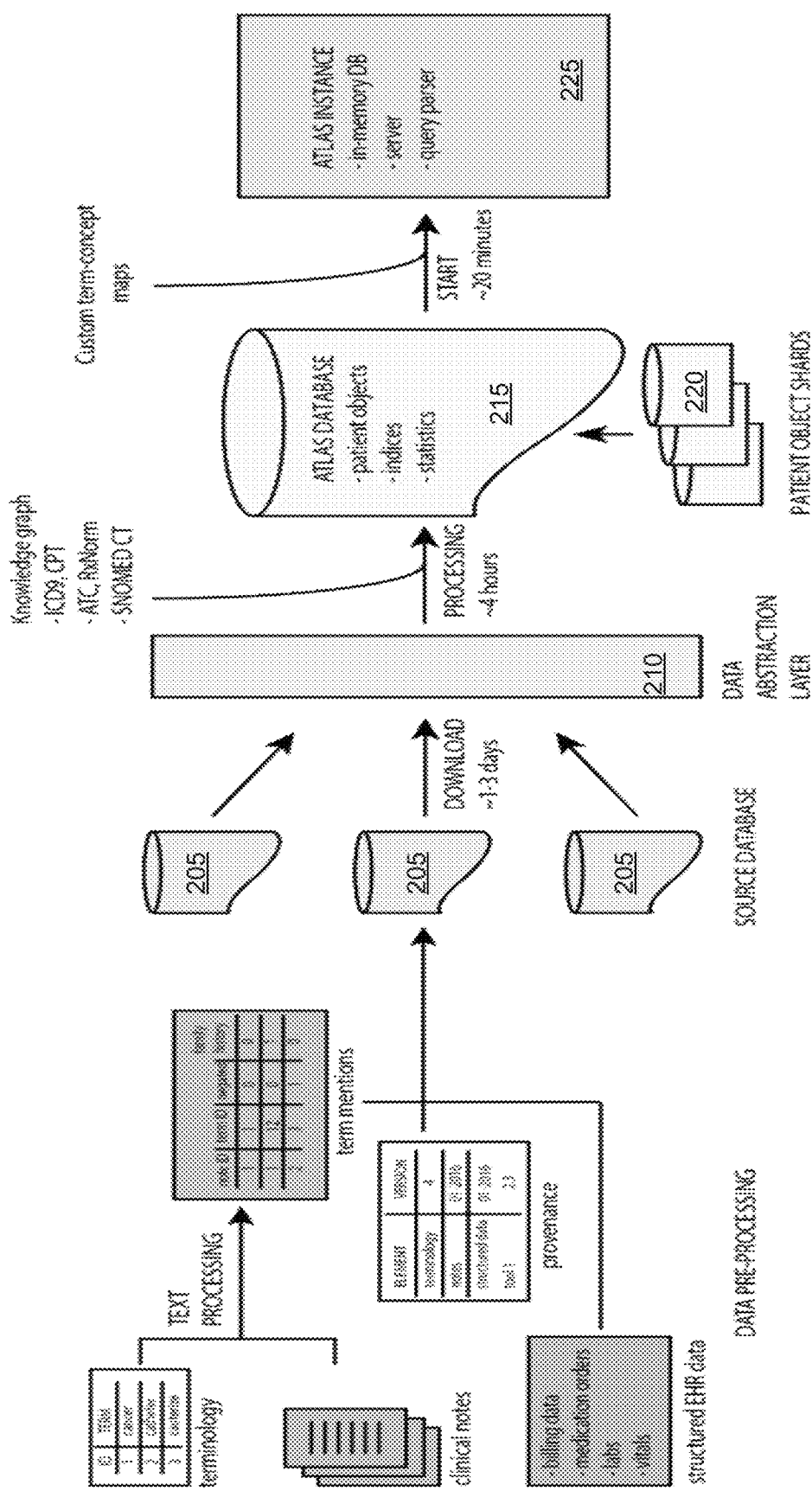
FIG. 2 conceptually illustrates an architecture deployed for use in the analysis of medical data in accordance with many embodiments of the invention.

An example of a system for data extraction and compression in accordance with an embodiment of the invention is illustrated in FIG. 1. The system 100 extracts unstructured data from a plurality of sources 105. In many embodiments, the sources may be third-party systems that store related data, data that is located across different systems within a single organization, data available from public sources, among any of a variety of different sources of data that may be available as appropriate to the requirements of different applications in accordance with embodiments of the invention. Each data source may provide a different type of data related to a particular data object and this data may be collected for storage and analysis within a single data object. The system uses a data abstraction layer 110 the processes the unstructured data using data models to determine how to store the data in a data object. The data objects, indices, and statistics about the data objects are stored in a database storage 115. In certain embodiments, data objects may also be stored in shards 120 based on the resources available within a particular environment. The system may also provide an application instance 125 that includes a query parser, server, and in-memory database. The application may be used to receive and execute user search queries against the data stored within the system. In several embodiments, the system may provide an application programming interface (API) through which applications executing on user devices may access and run queries against the data stored within the system. The API may be a web-based system, database system, or a software library. Although FIG. 1 illustrates a particular architecture for extracting and storing data, any of a variety of architectures may be utilized as appropriate to the requirements of specific applications in accordance with embodiments of the invention. An example of an architecture deployed for use in the analysis of medical data in accordance with many embodiments of the invention is illustrated in FIG. 2.

In many embodiments, the system 200 may be used in the context of the medical field, and in particular, for the analysis of patient medical data to enable the immediate identification of patient cohorts for research purposes. Likewise, the system may be used by doctors for real-time prognosis of patients and to help optimize patient care.

As noted above, in many embodiments, the data may be related to patient data, and the database may be created by extracting data from a variety of sources 205, including electronic health records (EHRs), health insurance claims databases, to a data abstraction layer. The data may include clinical notes, a list of common terminologies used in the particular field and structured EHR data. This data may be preprocessed to generate a variety of indexes that track term mentions.

The data abstraction layer 210 can be transformed into a database 215 of the system. In many embodiments, the data extraction uses a data model that structures patient records in major categories including demographics, diagnosis codes, measurements, procedures, and clinical annotations. The patient data is then stored as patient objects within a database 215 of the system and/or across patient object shards 220 of data. An application instance 225 can then perform search queries against this collection of structured data across dimensions in both time and space. Although FIG. 2 illustrates application of the system within a medical application, a system may be deployed in any of a variety of environments that require analysis of disparate unstructured data in both space and time as appropriate to the requirements of specific applications in accordance with embodiments of the invention.

Figure 3:
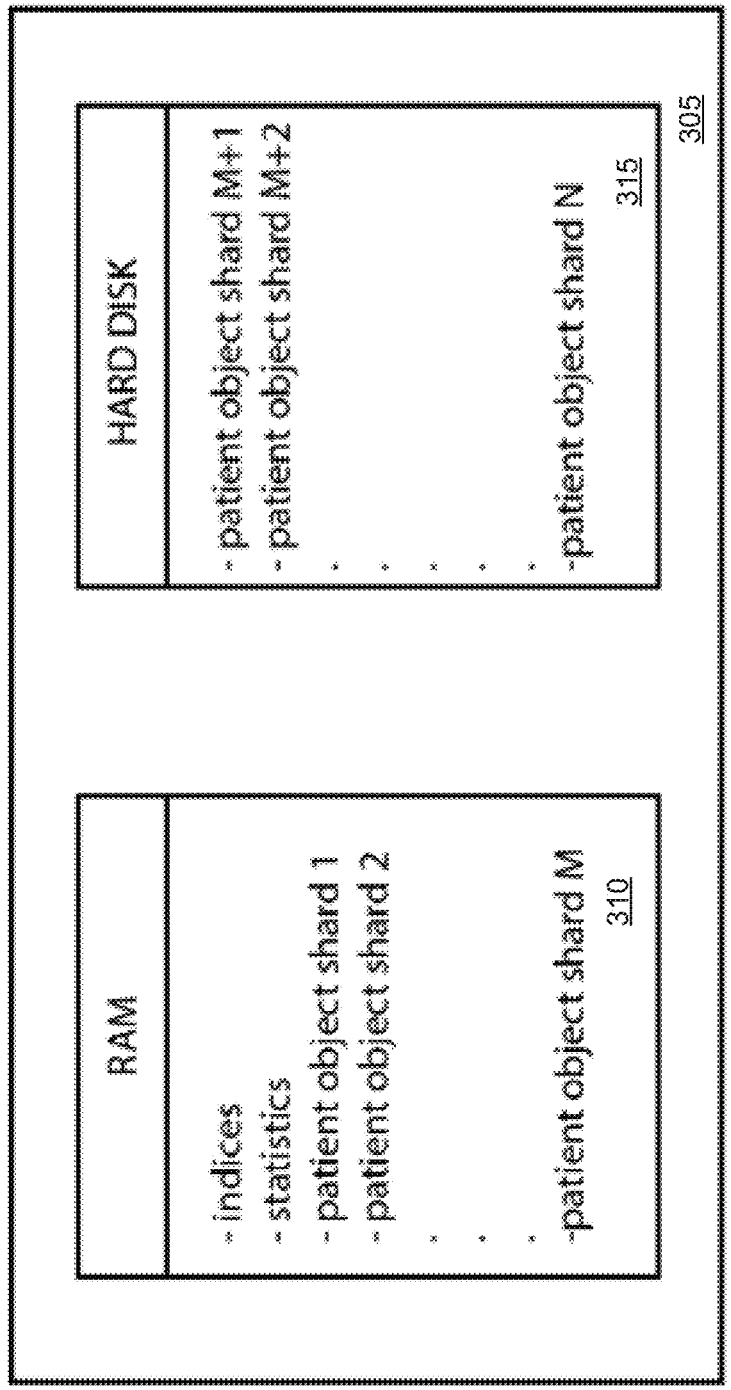
FIG. 3 conceptually illustrates a centralized model for storing data in a single node in accordance with an embodiment of the invention.

In many embodiments, storage of the data objects may depend based on the particular environment in which the system is being deployed. In many embodiments, the system may use three types of storage: (1) off-heap memory, (2) cache, and (3) on-disk shards. The proportion of data stored using each mechanism may be configured based on the environment where the system is being deployed. In certain embodiments, the data may be distributed across numerous database servers and/or locations while in other embodiments, it may be stored in a single database location. An example of storing all of the data in a single node model in accordance with an embodiment of the invention is illustrated in FIG. 3. As illustrated, a set of patient objects for objects 1 through M are stored in the RAM memory 310 of the system 305, while the remaining data objects M+1 through N are stored in a hard disk 315 of the system. Likewise, the RAM memory contains indices and statistics related to the data objects. Although FIG. 3 illustrates a particular distribution of objects allocated to different types of memory including RAM and hard disk, any of a variety of allocations may be made across a variety of memory types as appropriate to the requirements of specific applications in accordance with embodiments of the invention.

Figure 4:
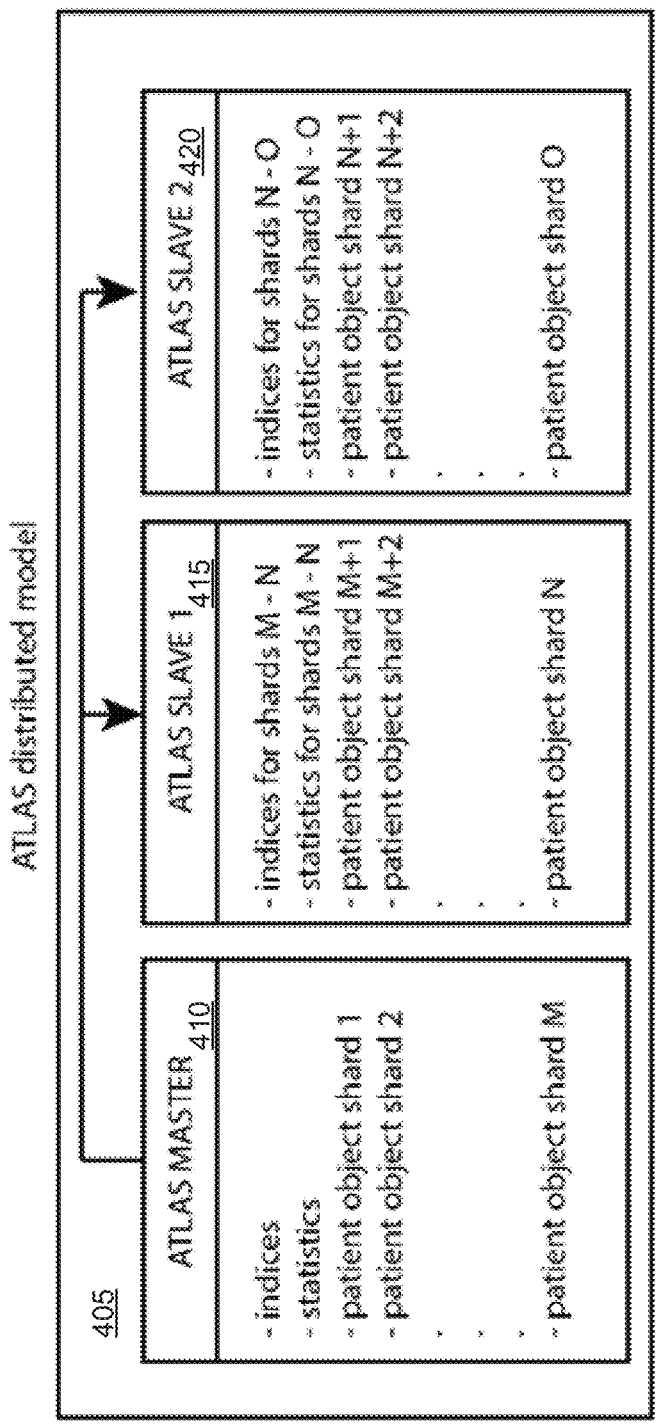
FIG. 4 conceptually illustrates a distributed model for storing data objects in accordance with an embodiment of the invention.

An example of a distributed model for storing data objects in accordance with an embodiment of the invention is illustrated in FIG. 4. The system 405 uses a master-slave configuration where the master 410 stores data object shards 1 through M and corresponding indices and statistics. Each slave stores the remaining data objects and corresponding indices and statistics. As illustrated, slave 415 stores indices for shards M-N, statistics for shards M-N, and data object shards M+1 through N. Likewise, slave 420 stores indices for shards N-O, statistics for shards N-O, and data object shards N+1 through O. Using a master-slave configuration allows for the parallel processing of the data objects stored within the different locations. Although FIG. 4 illustrates a particular master-slave configuration storing a particular set of data object shards, any of a variety of master-slave configurations may be utilized as appropriate to the requirements of specific applications in accordance with embodiments of the invention.

Query Lookups without Deserialization

In the context of data storage, serialization is the process of translating data structures or data objects into a format that can be stored (for example, as a byte stream in a file or memory buffer) and reconstructed later in the same or another computer environment. The opposite operation, extracting a data structure from a series of bytes, is deserialization (which is also called unmarshalling). In many prior art database applications, in order to satisfy a query that identifies a particular value for a data object stored within a database, the entire data object may need to initially be de-serialized, which requires significant processing and that the application allocate enough run-time memory for the full data object, before the application is able to obtain the queried values. Accordingly, the processing overhead associated with allocating memory to store the full data object at run time and deserializing and populating all data components of the data object can be a significant burden that requires extensive processing and allocation of memory.

Figure 5:
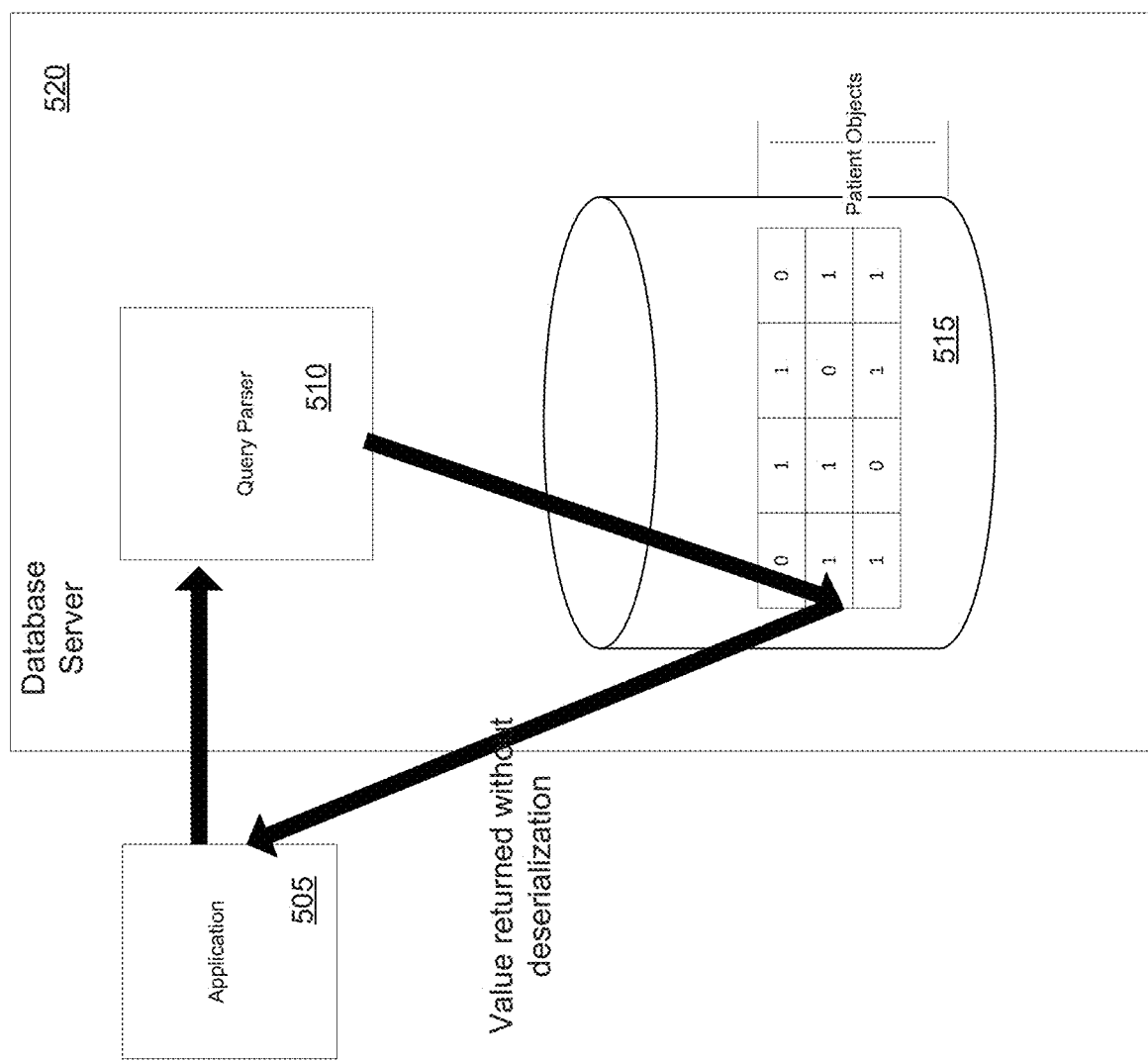
FIG. 5 conceptually illustrates reading data from a database without deserialization in accordance with an embodiment of the invention.

Accordingly, many embodiments of the invention are able to access data as it is stored in the byte stream format within the memory and to ascertain values for data objects stored within the database without having to deserialize the data objects. In particular, many embodiments structure and store the data in a format that enables for the immediate identification of needed data in the memory byte stream. An example of reading data from a database without deserialization in accordance with an embodiment of the invention is illustrated in FIG. 5. In particular, the application 505 provides a query to the database server 520. A query parser 510 parses the query and determines a memory location containing the requested data within the database 515. The value of this data is ascertained and returned to the application without having to deserialize any of the byte stream data or the data object in order to ascertain the value of the data. Although FIG. 5 illustrates a particular database server architecture for servicing query requests and accessing and retrieving data directly within a byte stream without deserialization, any of a variety of architectures may be utilized to provide data from memory without deserialization as appropriate to the requirements of specific applications in accordance with embodiments of the invention.

In order to avoid having to deserialize data objects in response to search queries, many embodiments of the invention structure the data objects to incorporate headers that may be used to quickly retrieve values for the data objects. In particular, information within the header may map the memory locations of the various data components within a body of the data object. By examining the information included within the header of the data object, the system is able to immediately identify the in-memory location of a requested data value stored in a particular data component of the data object, which enables fast lookups without the processing bottleneck of having to deserialize the data. An example of a data object structure for the efficient storage and retrieval of data values in accordance with an embodiment of the invention is illustrated in FIG. 6.

Figure 6:
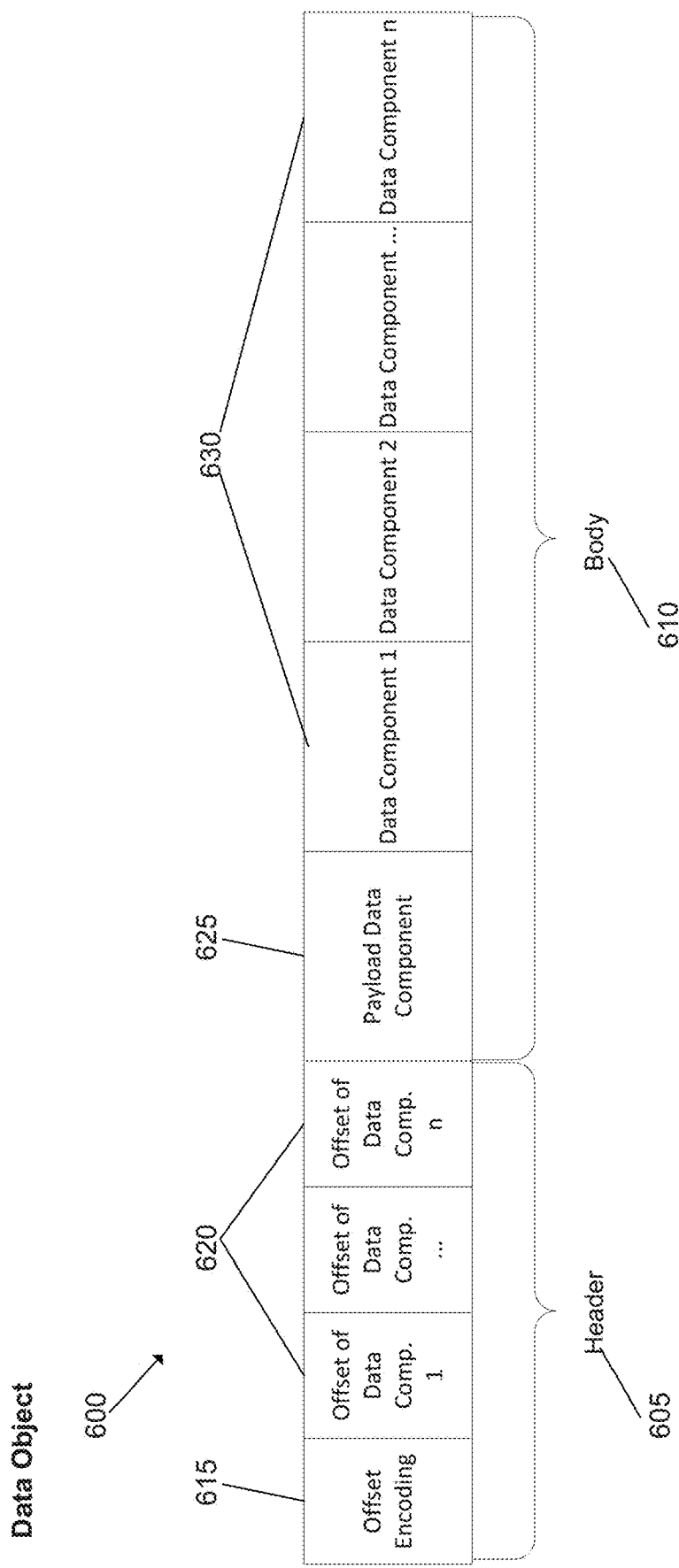
FIG. 6 conceptually illustrates a data object structure for the efficient storage and retrieval of data values in accordance with an embodiment of the invention.

In particular, FIG. 6 illustrates a data object 600 that includes a header 605 and a body 610. The header includes an offset encoding 615, and offset of data components 1 through n 620.

The offset encoding 615 may specify the encoding data type that is used to store all the data components offsets (0=INT, 1=BYTE, 2=SHORT). For example, if this byte has a value of 2, then read the following list of offsets as a SHORT data type. Each data object may have a different offset data type depending on what the maximum offset size is. If the last offset (difference between the start of a last data component and the position of start of data object in memory) is <=255, BYTE will be used to encode all the offsets, if it's larger, SHORT or INT will be used.

The offset of data component 620 may provide a number of bytes between the start of the data component in the data object body and the start of data object in memory. Each map may contain different portion of patient's data (e.g., ICD9 codes=>time points, CPT codes=>time points, lab values, age time intervals, vitals readings, medications, among other types of data).

In many embodiments, the body may include a payload data component 625 that is a map of payloadID to payload. Payload may be defined as any time point, time interval, time point containing additional information or time interval containing additional information.

Data component 630 can be one of the following types: hashmap, list, measured value list, computed value list, and further details regarding the different data components types are described below. Although FIG. 6 illustrates an example of a data object that includes a header that provides a memory map for a corresponding set of data components of the data object, any of a variety of information may be embedded within the data object as appropriate to the requirements of specific applications in accordance with embodiments of the invention.

Figure 7:
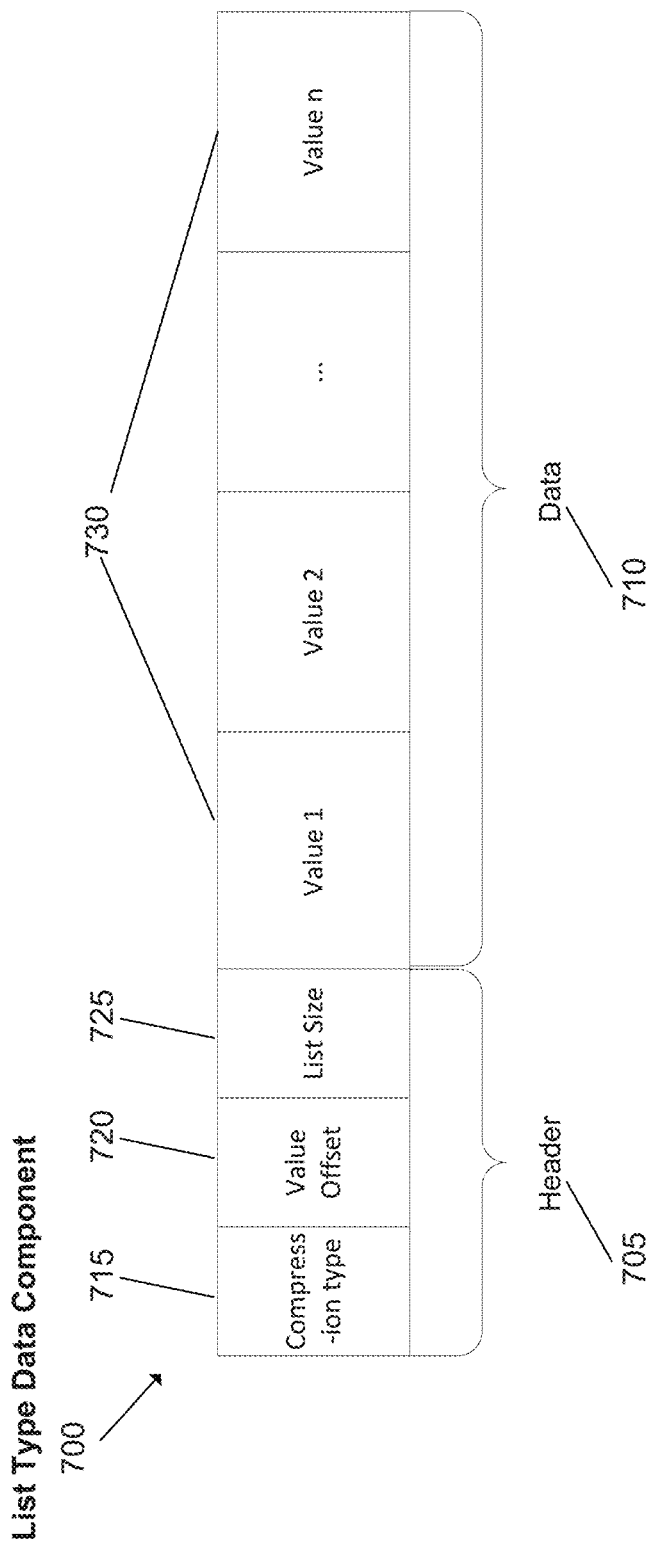
FIG. 7 conceptually illustrates a list type data component in accordance with an embodiment of the invention.

An example of a list type data component in accordance with an embodiment of the invention is illustrated in FIG. 7. The list data component 700 includes a header 705 and data 710. The header includes a compression type 715, value offset 720, and list size 725.

The compression type 715 may encode which data types will the values of the list have, whether to use offset and which data type will the size of the list use.

In many embodiments, the value offset 720 may be used if the compression type specifies the use of an offset. The offset may provide the minimum value in the list. In many embodiments, offset is used in cases where the use of the offset would decrease the data type requirement. For example, if the minimum value in the list=300 and maximum value is 356, offset can be 300 and value data type can be BYTE. Accordingly, if the offset was not used, each value data type may be SHORT.

In many embodiments, the list size 725 depends on the data type specified in the compression type, might be BYTE, SHORT or INT.

The data 710 portion of the list type data component may include values 1 through N 730. The values may provide the values encoded in specified data types. In many embodiments, if the value offset was used, the actual value would equal value n+value offset. Although FIG. 7 illustrates an example of a list type data component that includes a header with various fields and corresponding data, any of a variety of header fields may be included as appropriate to the requirements of specific applications in accordance with embodiments of the invention.

Figure 8:
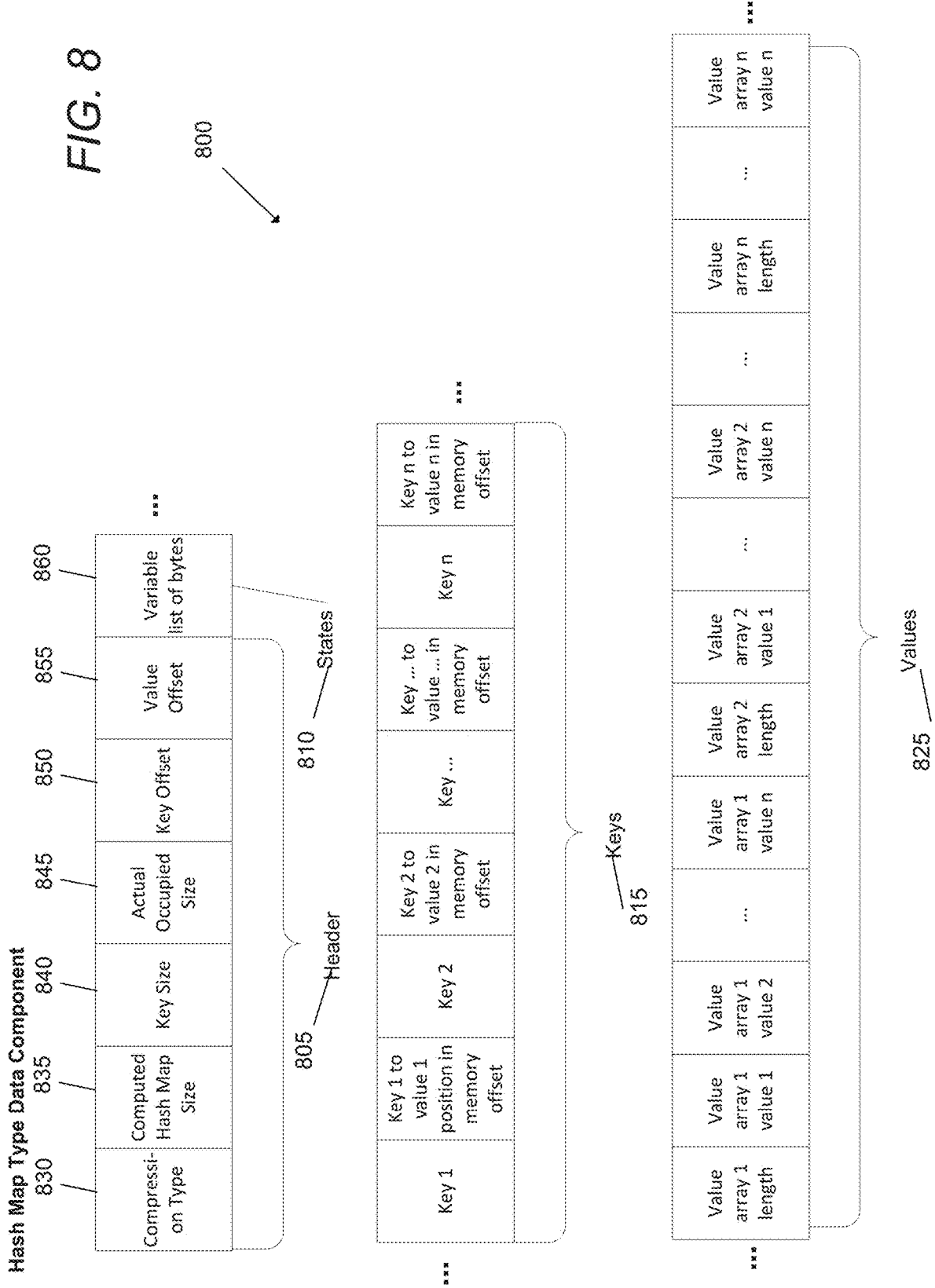
FIG. 8 conceptually illustrates a hash map type data component in accordance with an embodiment of the invention.

An example of a hash map type data component in accordance with an embodiment of the invention is illustrated in FIG. 8. The hash map type data component 800 includes a header 805, states 810, keys 815, and values 825. The header includes a compression type 830, computed hash map size 835, key size 840, actual occupied size 845, key offset 850, and value offset 860.

The compression type 830 (e.g., Byte, Short, INT, Reserved, among other data types) can be based on the following example. In particular, 10 bits out of 16 in first two bytes may be used and all bits may be set to 0 initially.

Bit 0=1=>key data type=SHORT;
Bit 1=1=>key data type=BYTE;
Bit 0=0 AND Bit 1=0=>key data type=INT;
Bit 0=1 AND Bit 1=1=>RESERVED;
Bit 2=1=>value data type=SHORT;
Bit 3=1=>value data type=BYTE;
Bit 2=0 AND Bit 3=0=>value data type=INT;
Bit 2=1 AND Bit 3=1=>RESERVED;
Bit 4=1=>offset data type=BYTE;
Bit 5=1=>offset data type=SHORT;
Bit 4=0 AND Bit 5=0=>offset data type=INT;
Bit 4=1 AND Bit 5=1=>RESERVED;
Bit 6=1=>value size type=SHORT;
Bit 7=1=>value size type=BYTE;
Bit 6=0 AND Bit 7=0=>value size type=INT;
Bit 8=1=>use value offset to downsize data type;
Bit 9=1=>use key offset to downsize data type;
Bit 10=1=>set is empty, do not read size or initialize with other than empty types;

The computed hash map size 835 may provide the number of actual keys and corresponding value mappings in the hash map (differs from key size and actual occupied size). The computed hash map size may be used in the hash function and to be reported as size.

The key size 840 may provide the number of keys.

The actual occupied size 845 may provide the maximum position of an occupied value in the list (equal to the maximum index in the states list).

In many embodiments, the key offset 850 may only be used if specified in the compression type as "use key offset". This value may be added to each key (offset is used to downsize data type)

In many embodiments, the value offset 855 may only be used if specified in the compression type as "use value offset". This value may be added to each value (offset is used to downsize data type).

The states 810 may provide a variable list of bytes 860. For each key in the corresponding list, there is a bit in the states list set to either 1 or 0, with 1 being the state is occupied and there is value attached to this key.

The keys 815 may include a key 1 and corresponding key 1 to value 1 position in memory offset through key n and corresponding key n to value n in memory offset. The key n may specify the actual key value (if key offset is set, the key offset value if added to the actual key value).

The key n to value n position in memory offset may specify the number of bytes to increment to get from the position of the key n to get to the position of the value n.

The values 825 may include value array 1 length, value array 1 value 1 through value array 1 value n, through to value array n length, value array n value 1 through value array n value n.

The value array n length may specify the length of the array of values that is the value of the key number n.

Value array n value n may provide a list of all the values within the list n (if value offset is used, each value will have the value offset added to it).

Although FIG. 8 illustrates an example of a hash map type data component with a particular set of fields, any of a variety of structures and fields may be specified for the hash map type data component as appropriate to the requirements of specific applications in accordance with embodiments of the invention.

Figure 9:
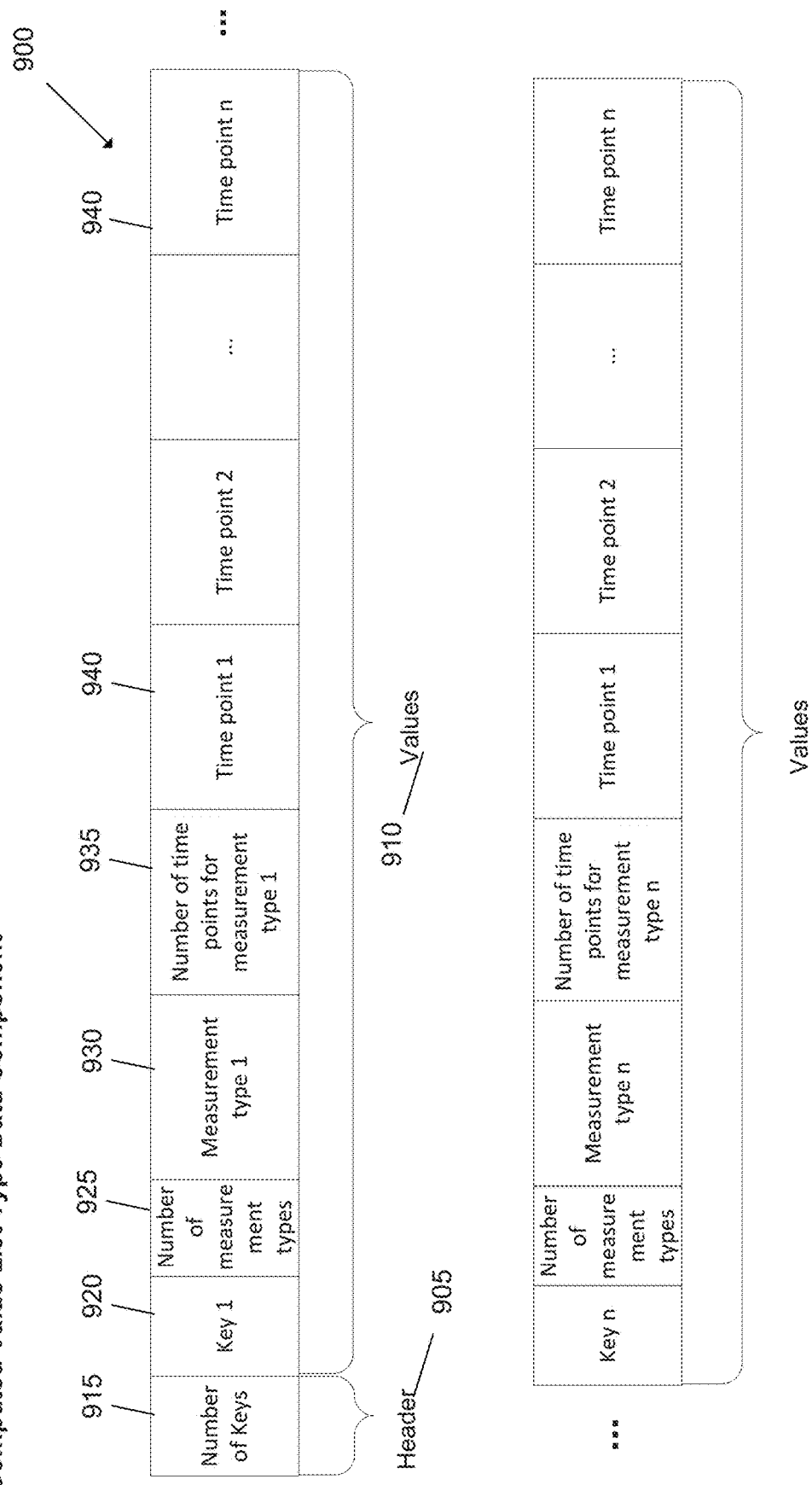
FIG. 9 conceptually illustrates a computed value list type data component in accordance with an embodiment of the invention.

An example of a computed value list type data component in accordance with an embodiment of the invention is illustrated in FIG. 9. The computed value list type data component 900 includes a header 905 and values 910. The header 905 includes a number of keys 915 which corresponds to a number of unique measurable items. For example, in the context of patient records, the key 920 may correspond to a number of labs, number of vitals, among numerous other measurable items.

The values 910 include keys 1 through n, with each key having a number of measurement types 925, measurement type n 930, number of time points for measurement type n 935, and time points 1 940 through time point n 940.

The key n 920 provides the measurable item identifier. For example, in the context of patient records, the key could be an identifier for an A1C lab.

The number of measurement types 925 specifies the number of different measurement types for the particular key n 0920. For example, for an A1C lab, the measurement types may be "HIGH", "LOW", and "NORMAL", and therefore the number of measurement types would equal 3.

The measurement type n 930 specifies the measurement for key n. For example, the measurement may be "HIGH" for the A1C lab.

The number of time points for measurement type n 935 provides the number of time points that have this measurement.

The time point n 940 provides the actual time point with the particular measurement. Although FIG. 9 illustrates an example of a computed value list type data component, any of a variety of computed value list types that include a variety of different fields that provide measurements along a time dimension may be specified as appropriate to the requirements of specific applications in accordance with embodiments of the invention.

Figure 10:
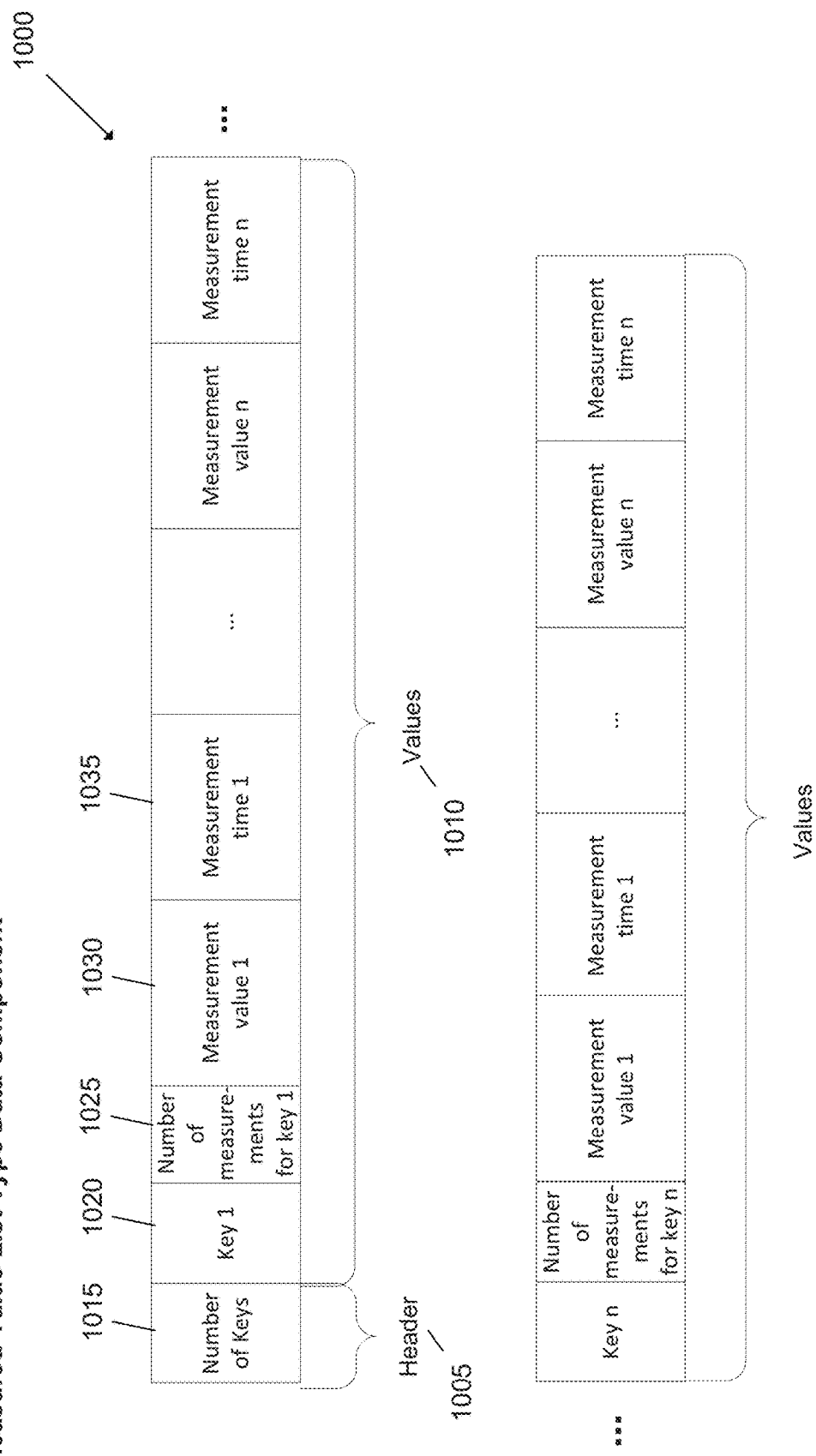
FIG. 10 conceptually illustrates a measured value list type data component in accordance with an embodiment of the invention.

An example of a measured value list type data component in accordance with an embodiment of the invention is illustrated in FIG. 10. The measured value list type data component 1000 includes a header 1005 and values 1010. The header 1005 includes a number of keys field 1020 that provide the total number of measurement types. For example, in the context of patient records, the number of keys field may provide the number of different vitals measurements that are available.

The values 1010 include key 1 1020 through key n, with each key 1 through key n having a number of measurements for key n, and corresponding measurement value 1 and measurement time 1 through measurement value n and measurement time n.

The key n 1020 field provides the measurable item identifier. For example, the context of patient records, the measurable item identifier may be the patient's height among any of a variety of different vital measurements.

The number of measurements for key n 1025 field provides the number of measurements for the measurable item n.

The measurement value n 1035 provides the measurement value for the measurable item n. In some embodiments, this may be encoded as an 8 byte double value downsampled to SHORT (with maximum number of distinct measurement values not exceeding 65536).

Although FIG. 10 illustrates an example of a measured value list type data component that includes a header and various values, any of a variety of data fields may be utilized as appropriate to the requirements of specific applications in accordance with embodiments of the invention. Processes for extracting unstructured data for storage as data objects in accordance with embodiments of the invention are described below.

Generation of Data Objects

Figure 11:
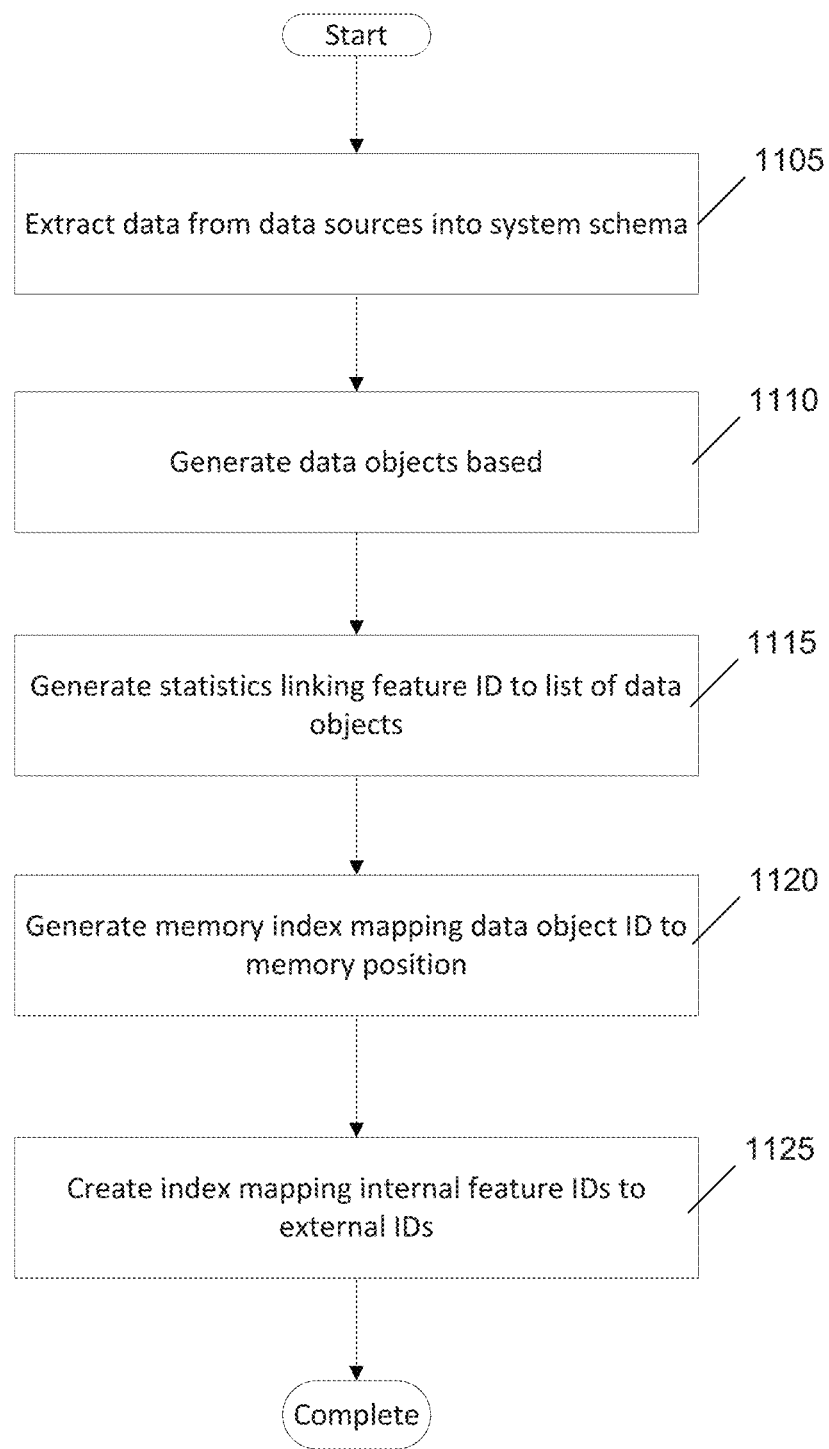
FIG. 11 illustrates a process for extracting and organizing data for efficient analysis in accordance with an embodiment of the invention.

In order to allow for the efficient analysis of data with respect to any of a variety of goals, including cohort identification, analysis of data over space and time dimensions, and fast data lookups, many embodiments of the invention structure unstructured data within a data-centric model that uses a variety of memory maps in order to quickly identify and retrieve needed data. A process for extracting and organizing data for efficient analysis in accordance with an embodiment of the invention is illustrated in FIG. 11.

The process extracts 1105 data from various sources into the system schema. In many embodiments, the process applies a variety of text based recognition algorithms to identify and extract relevant data from the data sources. In certain embodiments, the process extracts data using one or more data model templates that have been configured for a particular data source.

The process generates 1110 data objects. In some embodiments, the data object for a particular item may contain all of the related data to the item that has been extracted from the various data sources, providing a central data object structure that contains all of the information related to the data item. In many embodiments, a data object may correspond to a patient object, and may store a variety of information related to the patient including demographics and measured items (e.g., age, sex, nationality, location, height, among a variety of other items) computed items (e.g., measured vitals, labs, among a variety of other items), medical records (e.g., medication history, treatments, diseases, among a variety of other items), among a variety of other types of information that may be available from the various data sources. Accordingly, a single patient object may provide all of the related information for the patient that was otherwise dispersed across numerous disparate systems and database locations. In many embodiments, by storing all related information about a patient in a structured patient object data structure, the system may allow for the analysis and identification of relevant data for a variety of different objectives including cohort identification and/or real-time patient bed-side prognosis tools.

The process generates statistics linking internal identifiers to a list of data objects. In many embodiments, the statistics may include any of a variety of statistics as appropriate to the requirements of specific applications in accordance with embodiments of the invention. In many embodiments, the process generates a data index linking each internal identifier to a set of data object identifiers. In the medical context, the internal identifier may be a particular International Classification of Disease (ICD) identifier, and the process may identify and link the ICD disease code identifier with the set of patients that have been diagnosed and/or treated for the particular ICD9 code. For example, the ICD code may be code "1234" which relates to diabetes, and thus each patient that has been treated for diabetes will have the corresponding patient object identifier specified for this particular ICD code 1234.

The process generates a memory index mapping each data object identifier to its corresponding data object in the memory space. In the medical context, the memory index may contain a list of patient object identifiers and the corresponding memory location of the particular patient object. In some embodiments, the memory location may specify the start location in memory of the patient object. In other embodiments, different information may be specified such as memory offsets or particular memory location ranges (e.g., memory address 0xxx to Zxxx) as appropriate to the requirements of specific applications in accordance with embodiments of the invention.

The process generates an identifier index mapping the internal identifiers to external identifiers. In many embodiments, the internal identifier may be a compressed internal representation of the corresponding external identifier. For example, in the medical context, the ICD external code for diabetes may be "1234", and the process may generate an internal identifier such as "12" for this particular external code.

The process completes. Although FIG. 11 illustrates a process for extracting and organizing data within data object structures for efficient analysis, any of a variety of processes may be utilized for extracting and organizing data as appropriate to the requirements of specific applications in accordance with embodiments of the invention. Processes for optimizing the storage of data in accordance with embodiments of the invention are discussed below.

Figure 12:
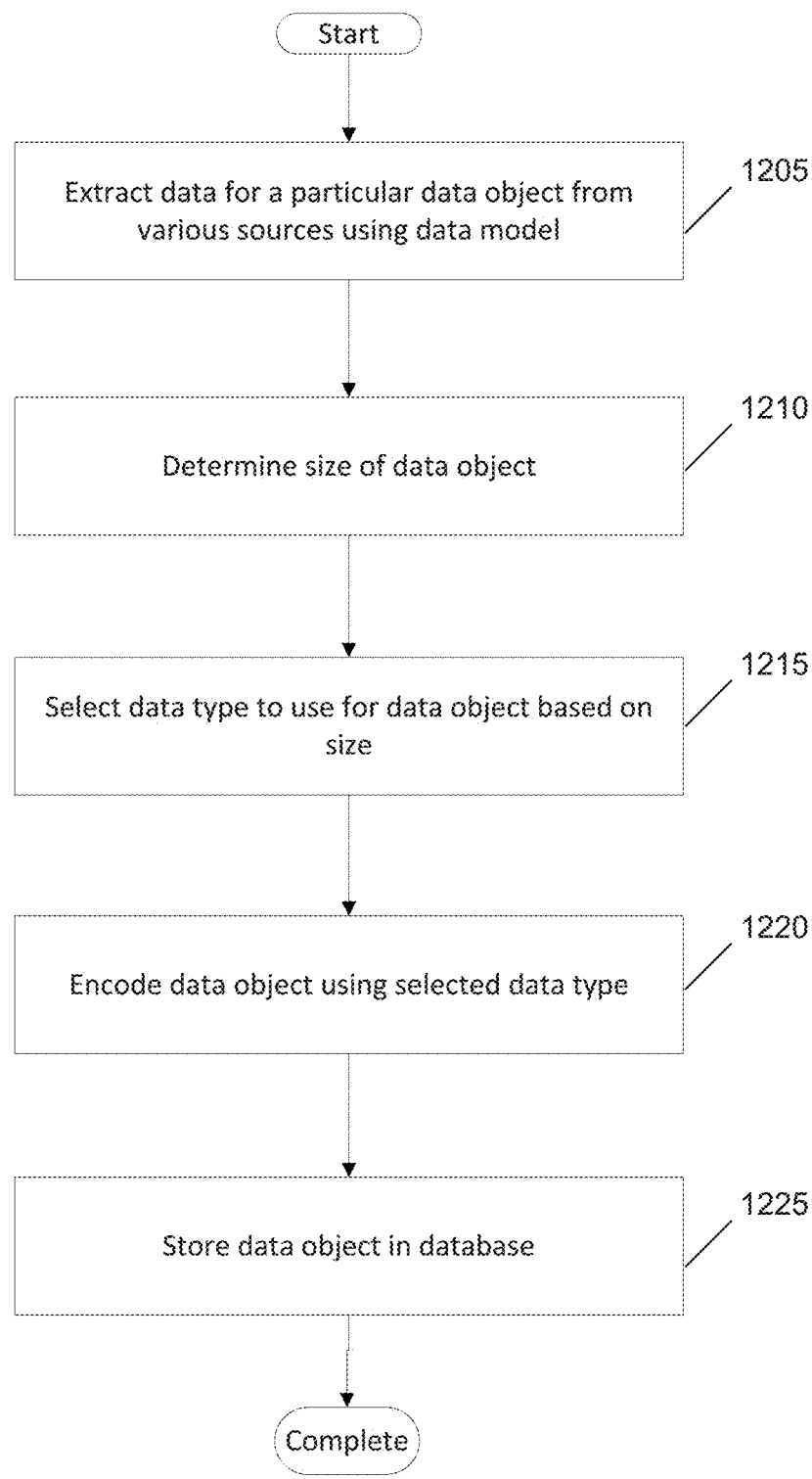
FIG. 12 illustrates a process for compressing data objects in accordance with an embodiment of the invention.

In many embodiments, the system optimizes the storage space that is allocated for storing the various data objects using various compression techniques. A process for compressing data objects in accordance with an embodiment of the invention is illustrated in FIG. 12. The process extracts at 1205 data for a particular data object from various data sources using various data models. The process determines at 1210 the size of the data object. For example, different data objects may have different sizes based on the amount of relevant information that is otherwise available and extracted from the various data sources. The process at 1215 selects a data type to use for the data object based on the size and encodes at 1220 the data object using the selected data type. For example, if the last offset (e.g., difference between the start of a last data component and the position of start of a data object in memory) is <=255, then "BYTE" may be used to encode all the offsets. If it's larger, then a different data type may be used (e.g., "SHORT" or "INT" may be used) as appropriate for the particular size. Accordingly, in many embodiments, the process encodes the data type that is being used to store all the data components offsets (e.g., 0=INT, 1=BYTE, 2=SHORT) within the header information of each particular data object. Accordingly, for example, if this header has a value 2, then read the following list of offsets as "SHORT" data type. Each data object may have different offset data types depending on its maximum offset size. The process stores at 1225 the data object in the database. The process then completes. Although FIG. 12 illustrates a process for encoding a data type based on a size of a data object, any of a variety of factors may be utilized in determining how to encode a data object as appropriate to the requirements of specific applications in accordance with embodiments of the invention.

Figure 13:
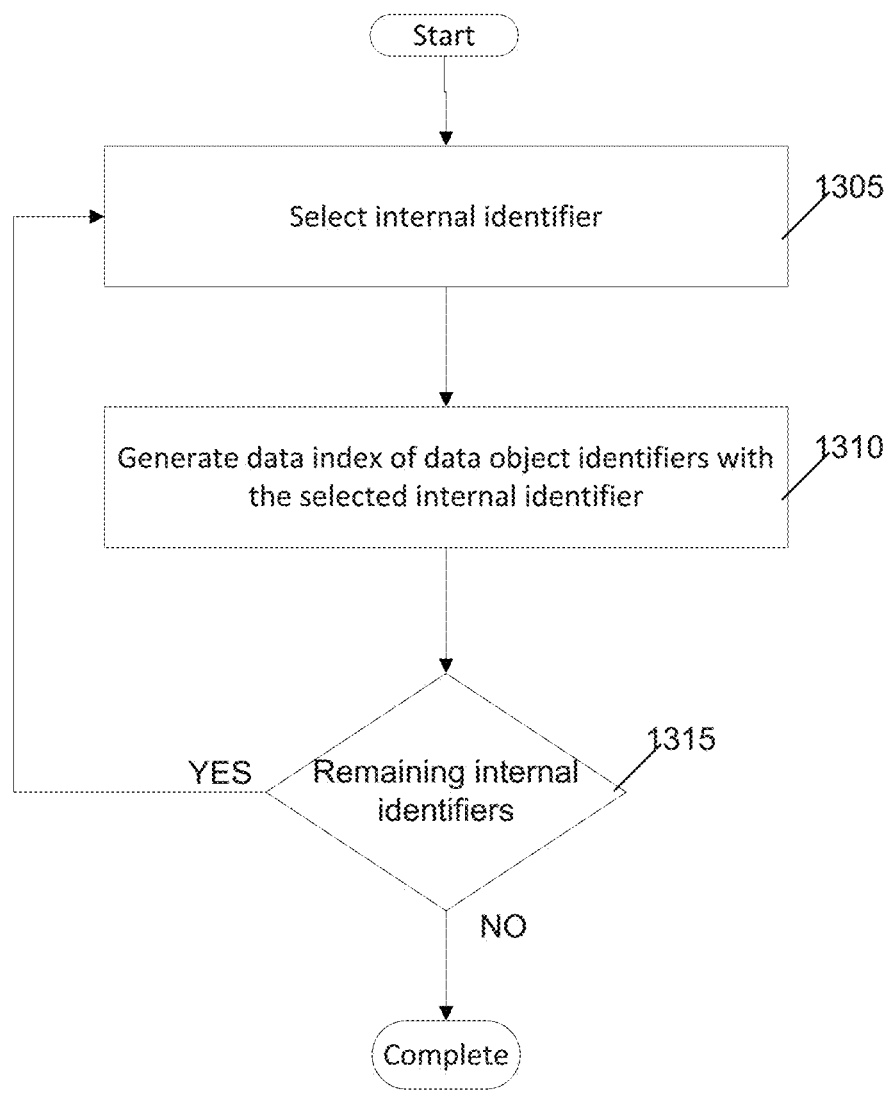
FIG. 13 illustrates a process for generating a data index in accordance with an embodiment of the invention.

In order to enable the quick identification and retrieval of requested data, many embodiments of the system utilize a variety of indexes that identify relevant data objects for each of a variety of different internal identifiers. For example, in the medical context, a set of internal identifiers may be specified that each correspond to a particular disease, and for each disease a corresponding set of patients may be identified as having a history of the disease. By generating these indices, the system can quickly service any of a variety of query requests that would otherwise require extensive processing. A process for generating a data index in accordance with an embodiment of the invention is illustrated in FIG. 13. The process selects at 1305 an internal identifier. The process generates at 1310 a data index that includes a list of data object identifiers that relate to the selected internal identifier. The process determines at 1310 if there are remaining internal identifiers and returns to 1305 to examine the remaining internal identifiers if they still remain. Otherwise, the process completes. Although FIG. 13 illustrates a process for generating a data index mapping internal identifiers to a list of data object identifiers, any of a variety of processes may be utilized as appropriate to the requirements of specific applications in accordance with embodiments of the invention.

Figure 14:
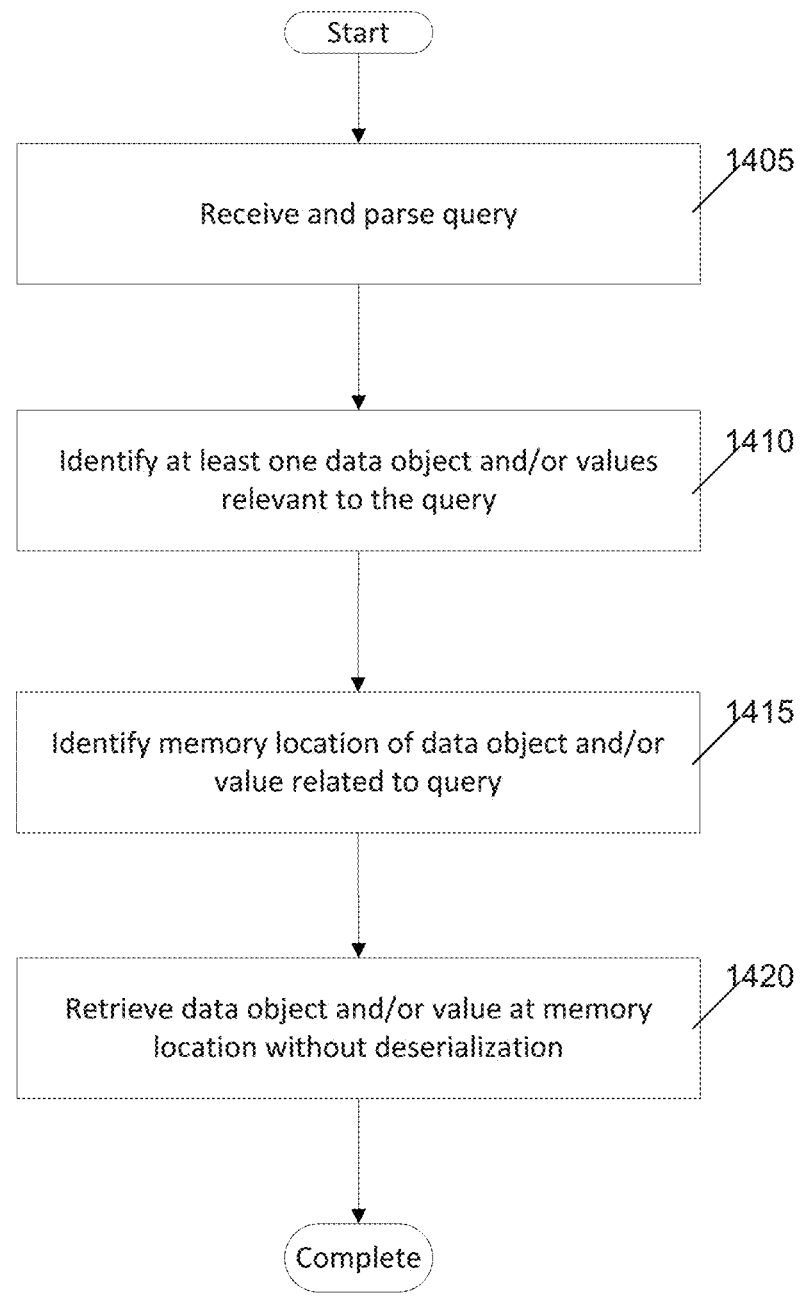
FIG. 14 illustrates a process for executing queries to identify relevant data in accordance with an embodiment of the invention.

Many embodiments of the system may be utilized in order to execute sophisticated queries across large data sets in both space and time dimensions and to immediately identify and return relevant data. Accordingly, in order to minimize the processing time needed to service the query requests, many embodiments of the system are able to identify the exact location of a requested data in memory and without having to deserialize the data objects which significantly reduces the processing overhead associated with servicing query requests. An example of a process for executing queries to identify relevant data in accordance with an embodiment of the invention is illustrated in FIG. 14.

The process receives and parses at 1405 a query. The process identifies at 1410 at least one data object and/or data value relevant to the query. In some embodiments, the query may be requesting information related to an external identifier and the process may locate a corresponding internal identifier specified for the external identifier, and then identify, using a pre-compiled data index, a list of relevant data object identifiers that have been specified for the particular internal index. The process identifies a memory location of the data object and/or data value related to the query. In some embodiments, the process may utilize a memory map that maps the memory location of each data object identifier to the exact memory location of the data object. For queries that are requesting a particular data component of a data object, the process may examine a header of a data object to determine the exact memory offset starting location of the particular data value within the memory, thereby avoiding having to analyze the entire data object to locate the particular data value being requested. For example, in the medical context, a query may be specified that requests all of the ethnicity values for patients that have diabetes with ICD 1234. Accordingly, the data index for ICD 1234 may specify a set of patient objects, and the ethnicity of these patient objects may be specified in a particular data component that can be quickly ascertained based on the metadata header information of each of the particular patient objects. For example, the header of a patient object may specify that the ethnicity of the patient object begins at a memory offset of 4 bytes from the start of the patient object in memory.

The process retrieves the data object and/or data value at the memory location without deserialization. In particular, in many embodiments, by knowing the exact memory location of a requested value within memory, the process does not need to re-construct (e.g., deserialize) the data object in order to examine the various values of the data object. Rather, in many embodiments, the process can obtain a needed value as it is stored within the byte stream in memory. The process then completes. Although FIG. 14 illustrates a process for servicing query requests using memory locations to retrieve data, any of a variety of processes for servicing query requests may be utilized as appropriate to the requirements of specific applications in accordance with embodiments of the invention. Examples of the user interface for executing queries for cohort identification in accordance with many embodiments of the invention are discussed below.

System User Interface

Many embodiments, of the system are able to execute sophisticated queries in both space and time dimensions for a variety of purposes, including cohort identification and analysis. An example of the execution of a query and corresponding user interface screens in accordance with an embodiment of the invention is illustrated in FIGS. 15-20.

Figure 15:
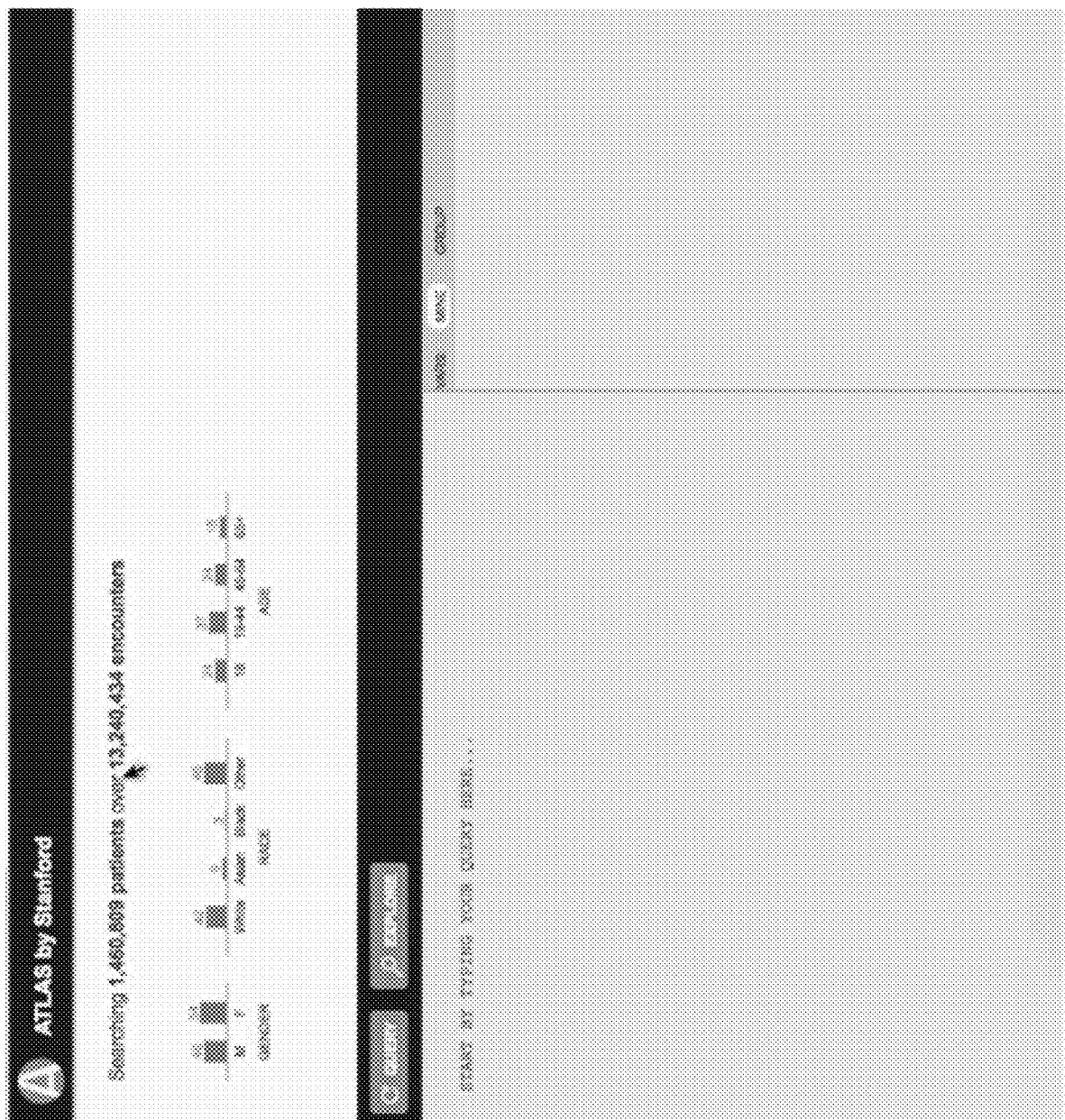
FIG. 15 illustrates a user interface that includes an area to type a query along with statistics regarding the size of a patient cohort in accordance with an embodiment of the invention.
Figure 16:
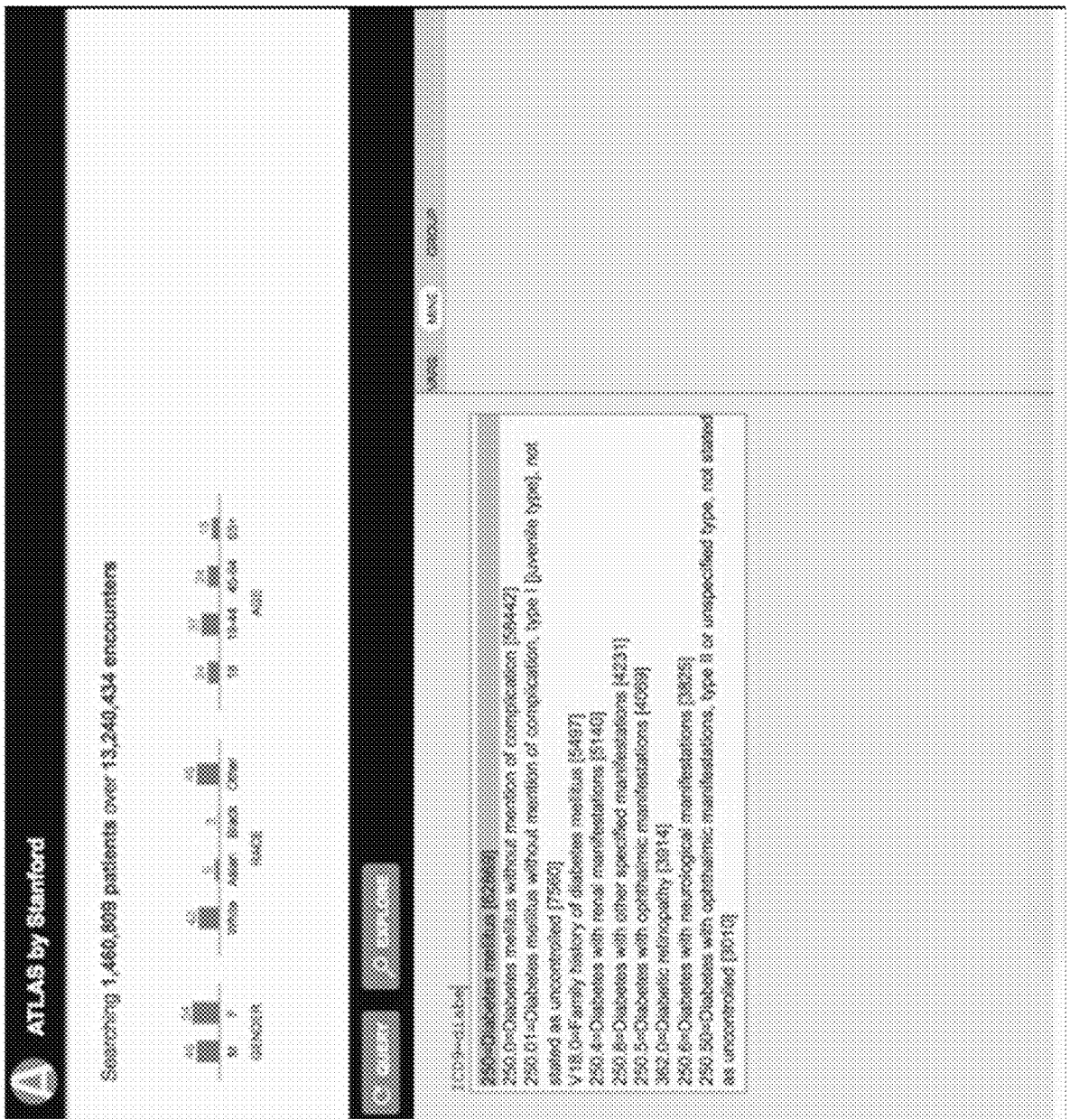
FIG. 16 illustrates a user entering an ICD9 code, which populates a list of possible queries from which the user may select in accordance with an embodiment of the invention.
Figure 17:
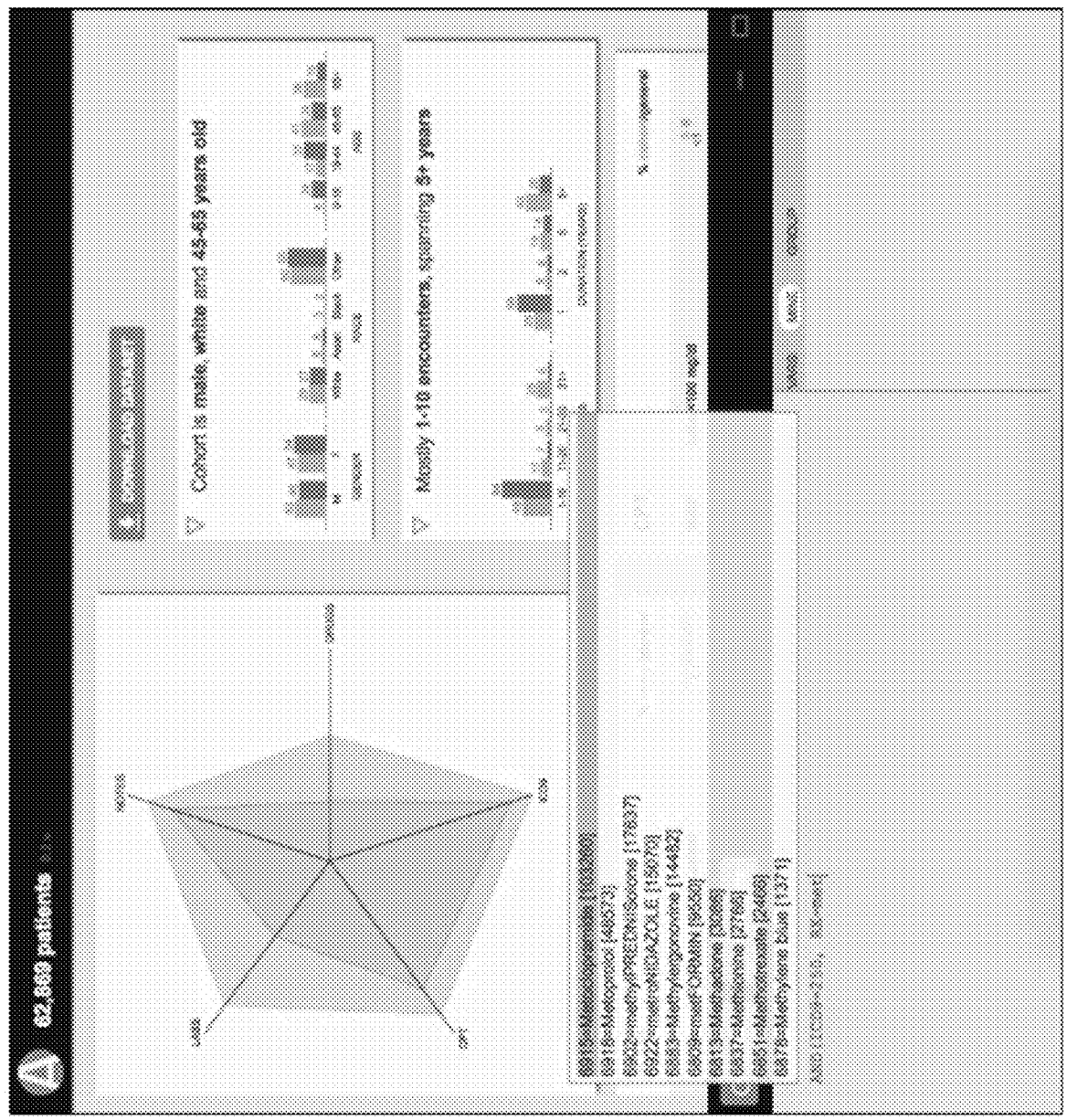
FIG. 17 illustrates a user requesting that the cohort include patients that have been prescribed a certain medication in accordance with an embodiment of the invention.
Figure 18:
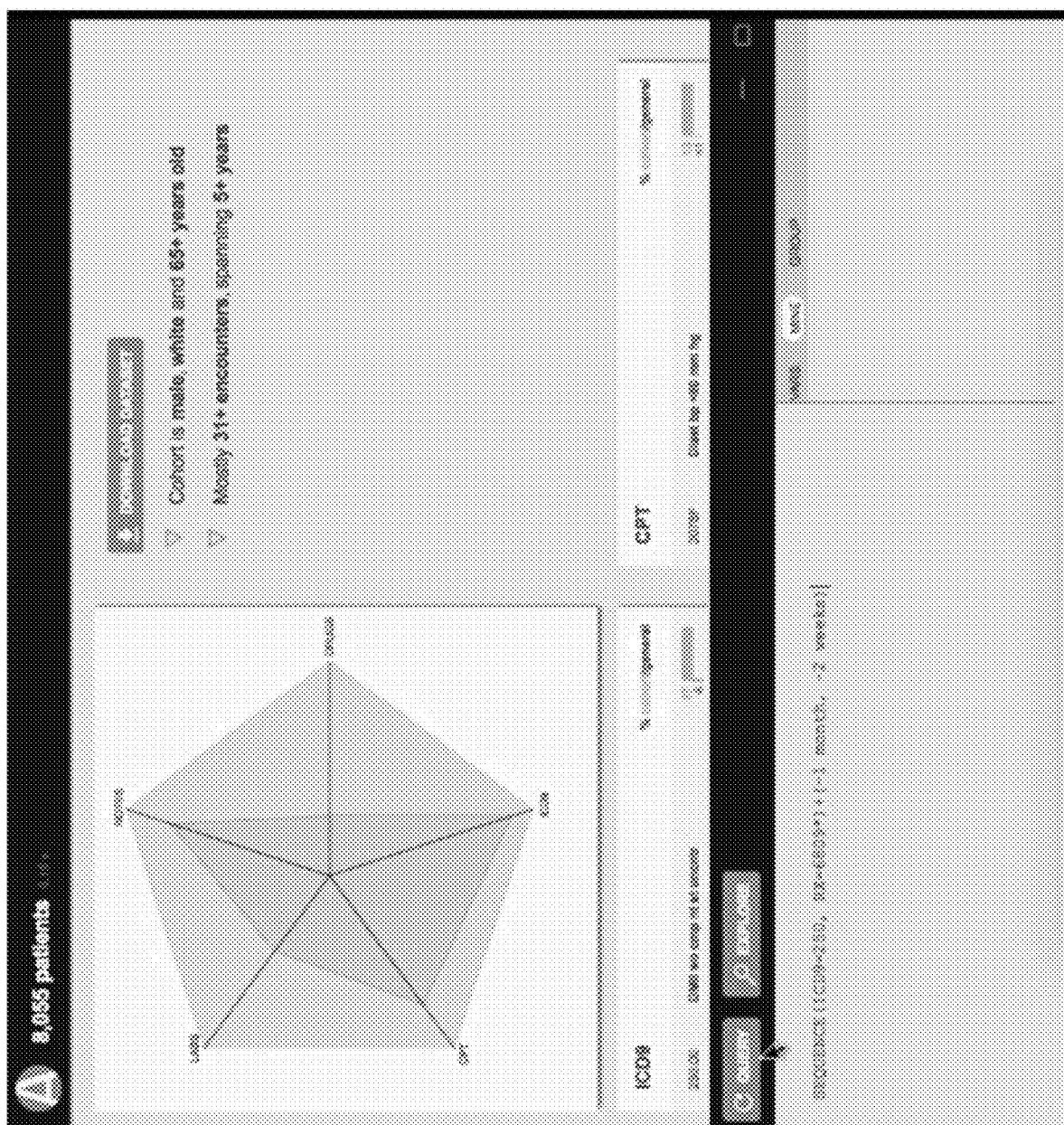
FIG. 18 illustrates a user specifying a particular time constraint on a set of data in accordance with an embodiment of the invention.
Figure 19:
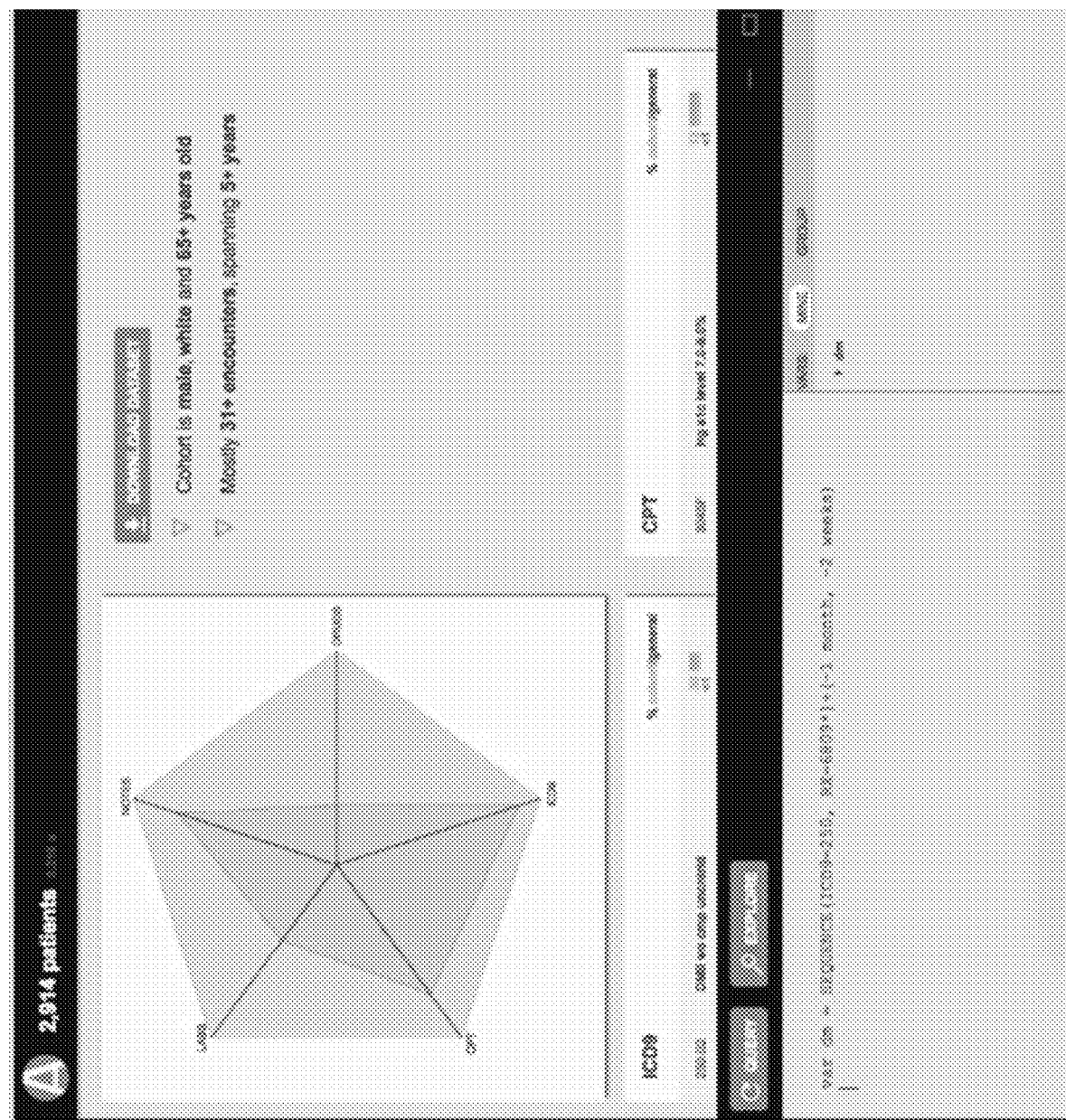
FIG. 19 illustrates a user specifying a variable "dm" for a particular query in accordance with an embodiment of the invention.
Figure 20:
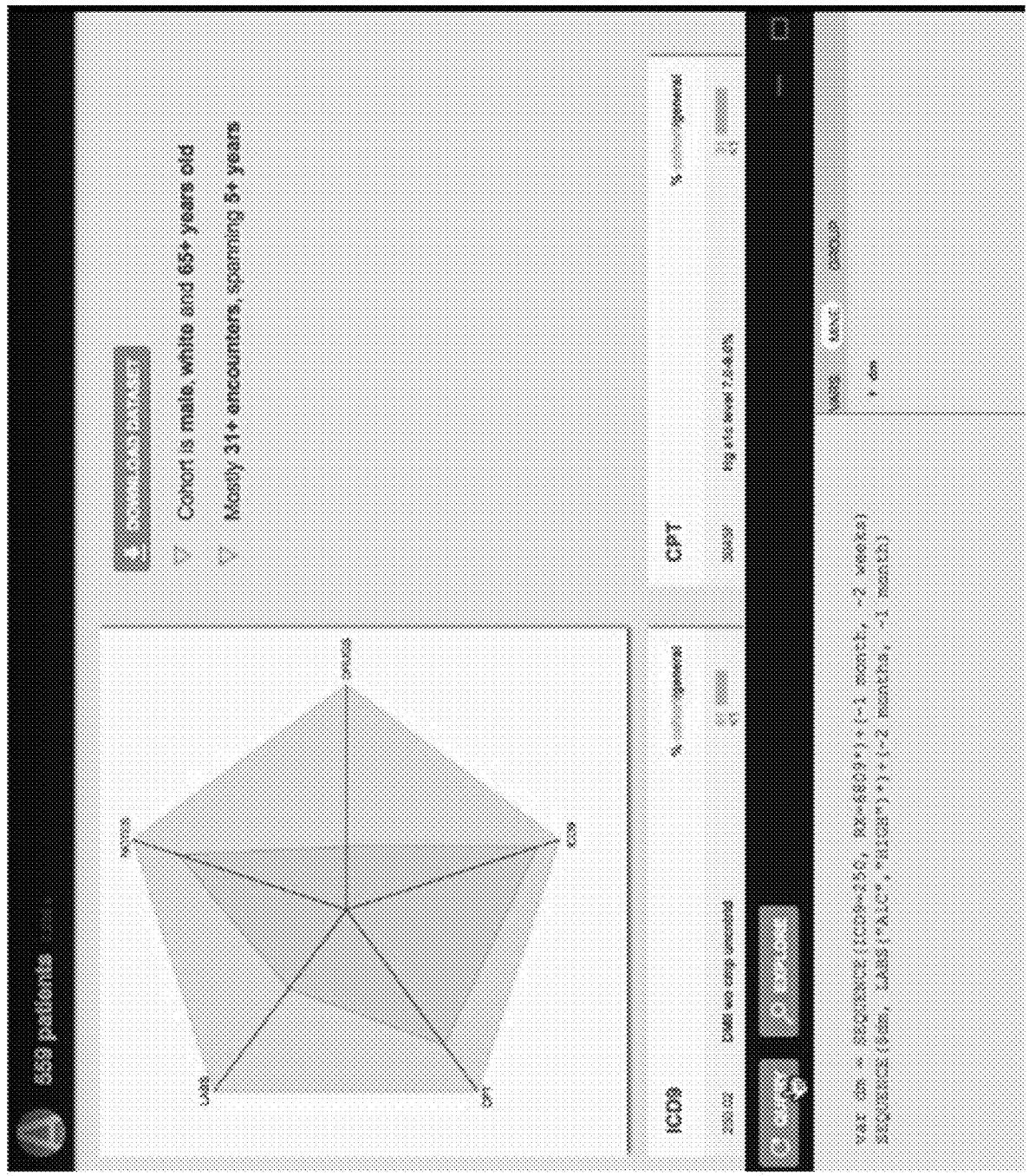
FIG. 20 illustrates a user further defining a query to include certain lab values in accordance with an embodiment of the invention.

In particular, FIG. 15 illustrates the user interface, which includes an area to type a query along with some statistics regarding the size of the patient cohort, gender, race, and age. FIG. 16 illustrates a user entering the ICD9 code for diabetes, which populates a list of possible queries from which the user may select. FIG. 17 illustrates the user has also requested that the cohort include patients that have been prescribed a certain medication (e.g., RX=Metoclopramide). Accordingly, the system has identified a set of patients that satisfy these criteria. FIG. 18 illustrates that the user has specified a particular time constraint on this data, which further refines the set of patients that have been selected for the particular query. FIG. 19 illustrates the user has specified a variable "dm" for this particular query, allowing the user to use the variable rather than having to re-write the query in the future. FIG. 20 illustrates the user further defining the query to include certain lab value (e.g., "A1C", "high") as well as using the variable $dm. The system has now identified 559 patients as satisfying the query criteria. Although FIGS. 15-20 illustrate an example of a user interface of a system for cohort identification, any of a variety of user interfaces may be utilized as appropriate to the requirements of specific applications in accordance with embodiments of the invention. A detailed discussion of a particular query language that may be utilized by an embodiment of the system is set forth below.

Temporal Query Language (TQL)
TI=time interval (for example [0-2, 1-3, 1-5, 5-10])
CTI=computed time interval (for example [0-10])
TP=time point (internally a time interval with same time of start and end)
CPT=examples: 12345 or 1234F
ICD9=examples: 022, 022.2, 022.22, E123, E123.1, E123.12, V01, V01.1, V01.01
NOTE_TP=TP with payload information [TP, NOTE_ID]
ICD9_TI=TI with payload information [TI, ICD9_ID]
MAX=Integer.MAXIMUM (maximum positive number)
MIN=Integer.MINIMUM (minimum negative number)
Automatic Result Type Conversions
TP=>TI[TP, TP]
TP=>BOOLEAN[is TP empty]
TI=>BOOLEAN[is TI empty]
TI=>TP (undefined)
TI=>CTI
CTI=>TI (undefined)
BOOLEAN=>TIMELINE
BOOLEAN=>TP (undefined)
NOTE_TP=>TP
ICD9_TI=>TP
Comments
Comments are portions of the query that are not evaluated.
1. Line comment is a comment starting with // and ending with end of line
2. Multi line comment is a comment starting with /* and ending with */
Examples:
var a=ICD9=250.00 // this is a comment
// also a comment
comment nr. 2
/* multi line comment
another multi line comment */
$a
Variables
Variable Definition:
var variable=UNION(ICD9=200.2, ICD9=100.1)
Variable Usage:
INTERSECT($variable1, $variable2)
Saving Variables to Server
var domain_name.variable_name=UNION(ICD9=200.2, ICD9=100.1);

Domain name is an identifier string that allows grouping variables into cohesive units. For example, users can store their variables under their name.

Variables that contain other variables will be stored after evaluating the nested variables, so that no dependencies between stored variables exist.
Example:
var variable1=UNION(ICD9=100.1, ICD9=200.2)
var variable2=INTERSECT(ICD9=200.3, ICD9=300.3)
var john.variable3=UNION($variable1, $variable2)
john.variable3 will be stored as UNION(UNION(ICD9=100.1, ICD9=200.2),
INTERSECT(ICD9=200.3, ICD9=300.3))

Accessing Saved Variables
Example: AND($my_workspace.variable_name, ICD9=300.30)

Note that when declaring a variable and not using it in the same query, you will receive an error (no query), but the variable will be persisted.
Example:
var john.variable=ICD9=200.5

This will define a global variable, but will not store it. Variable will be stored only after you call the variable with .finalize, .store or .save suffix. Already defined variables cannot be overwritten. Once the finalize was called, the variable is read only. This also means that when you attempt to redefine a variable that was already saved, this will throw an error.
Example:
var john.variable=ICD9=200.5
$john.variable.finalize
Defining variable without storing it:
var john.variable=ICD9=200.5
$john.variable If the variable john.variable was persisted, redefining it will throw an error message.

Basic Temporal Operations
Timeline
  Returns a single TI containing patient's entire timeline.
Returns: TI.
ATC
  Returns TI during which the patient had at least one RXNorm code belonging to the specified ATC.
Returns: TI.
Example: ATC="XXX"
Encounters
  A day during the patient had at least one encounter (encounter is a visit and no other event counts as an encounter). Returns a list of TI that are computed in such a way that each TI is exactly 1 day long and there is no overlap.
Notes
  Returns all time instances when the patient had text notes. Allows performing COUNT operations, etc.
Patients(X, Y, Z)
  Returns patients with the specified patient IDs. These can be used for further queries.
Returns: BOOLEAN.
Example: AND(PATIENTS(1, 3, 5, 7, 12), ICD9=250.00)
SNOMED=
  Returns a list of TI during which the patient had the specified SNOMED code.
Returns: TI.
Example: SNOMED=12345
SNOMED
  Returns a list of all SNOMED TI for a patient.
Returns: TI.
Example: SNOMED
CPT=
  Returns a list of TI during which the patient had the specified CPT code.
Returns: TI.
Example: CPT=12345
CPT
  Returns a list of all TI for all CPT codes of a patient. Is equivalent to UNION(CPT= . . . ).
Returns: TI.
VISIT TYPE="xxxx"
  Returns time interval during which the patient had the specified visit type.
Returns: TI.

Example:
VISIT TYPE="inpatient"
ICD9=
  Returns a list of ICD9_TI during which the patient had the specified ICD9 code.
Returns: TI.
Example:
ICD9=E123.22
ICD9
  Returns a list of all ICD9_TI for a patient. Is equivalent to UNION(ICD9= . . . ).
Returns: TI.
ICD10=
  Returns a list of ICD10_TI during which the patient had the specified ICD10 code
Returns: TI.
Example:
ICD10=A00.0
ICD10
  Returns a list of all ICD10_TI for a patient. It is equivalent to UNION(ICD10= . . . )
Returns: TI.
NOTE TYPE="xxx"
  Returns a time interval when the patient had note with the specified note type.
Returns: NOTE_TP.
Example: NOTE TYPE="Progress Note, Outpatient"
  In order to tie the note type to specific commands, use the NOTE command:
Example:
NOTE(NOTE TYPE="Progress Note, Outpatient", TEXT="diabetes")
Primary
  Returns TI for which the patient had the ICD9 code mentioned as primary diagnosis. This command allows only one argument. Only usable on a single ICD9 code parameter.
Returns: TI.
Example:
PRIMARY(ICD9=E123.22)
  To return times when the code was mentioned but was not a primary code:
INTERSECT(ICD9=E123.22, INVERT(PRIMARY(ICD9=E123.22)))
RX=
  Returns a list of RXNORM_TP during which the patient had the specified RXNORM code.
Returns: RXNORM_TI.
Example:
RX=122
RX
  Returns a list of all RXNORM_TI for a patient. Equivalent to UNION(RX= . . . ).
Returns: RXNORM_TI.
Example: RX
Drug
  Allows querying additional properties of a drug (drug status and drug route).
Returns: TI.
Example: DRUG(RX=122, STATUS="discontinued", ROUTE="intravenous")
  DRUG(RX=122, STATUS="discontinued")
  DRUG(RX=122, ROUTE="intravenous")
TEXT=" "
  Returns a list of NOTE_TP where the patient had specified text mentioned not in a negation or family history context.
Returns: NOTE_TP.

Example:
TEXT="diabetes"
!TEXT=" "
    Returns a list of NOTE_TP where the patient had specified text mentioned in a negated context.
Returns: NOTE_TP.
Example:
!TEXT="diabetes"
~TEXT=" "
    Returns a list of NOTE_TP where the patient had specified text mentioned in a family history context.
Returns: NOTE_TP.
Example:
~TEXT="diabetes"
NOTE(TEXT=" ", TEXT=" ")
    Returns a list of NOTE_TP where all the text specified occurs in one note.
Returns: NOTE_TP.
Example:
NOTE(TEXT="diabetes", TEXT="metformin")
    NOTE also accepts boolean operators (AND, NOT, OR) as their parameters.
    NOTE itself behaves in a same way as the command NOTE(AND(TEXT=" ", TEXT=" "))
    NOTE(OR(TEXT=" ", TEXT=" ")) returns all patients that have any of the specified texts.
    This is identical to OR(TEXT=" ", TEXT=" ")
NOTE(NOT(AND(TEXT=" ", TEXT=" "))) is identical to NOT(NOTE(TEXT=" ", TEXT=" "))
    Boolean notes allow more complex queries such as:
NOTE(AND(TEXT="diabetes", OR(TEXT="treated", "treatment", "controlled),
NOT(TEXT="uncontrolled"))
YEAR(START, END)
    Returns a TI during which the patient had any code during the specified year. Caution: Year only contains the intervals explicitly defined in visits and notes. There is no computation of missing intervals, so using EXTEND BY could lead to an interval that has undefined YEAR.
Returns: TI.
Example:
YEAR(2008, 2010)
    Caution: Year only contains the intervals explicitly defined in visits and notes. There is no computation of missing intervals, so using EXTEND BY could lead to an interval that has undefined YEAR.
Gender
    Returns the timeline of patients with the specified gender.
Returns: BOOLEAN.
Example:
GENDER="MALE"
Race
    Returns patients with the specified race.
Returns: BOOLEAN.
Example:
RACE="WHITE"
Ethnicity
    Returns patients with the specified ethnicity.
Returns: BOOLEAN.
Example:
ETHNICITY="LATINO"
Death
    Returns the TP of all patients' death, empty TP if death was not recorded.
Returns: TP.
Example:
DEATH
NULL
    Returns an empty TI.
Vitals
    Returns the time points at which the specified vital was recorded. If values are specified, returns the time points at which the specified vital had the had specified values. If no parameters are provided, all times when the patient had vitals recorded are returned.
Returns: TI.
Examples:
VITALS("Pulse")
VITALS("Pulse", 60, 100)
VITALS("Pulse")
VITALS
Labs
    Returns the time points at which the specified lab test was recorded. If values are specified, returns the time points at which the specified lab had the specified values. If no parameters are provided, all times when the patient had labwork recorded are returned. When querying for a specific value, units of measure should be provided as the second parameter. If no units are provided and the lab has multiple units specified, this will fail the query. Units can be omitted when the lab has only one unit.
Returns: TI.
Example:
LABS("WBC", "NORMAL")
LABS("WBC")
LABS("WBC", 12, MAX)
LABS("WBC", "mg/dl", 12, MAX)
LABS
Original
    Returns the time intervals at which a single ICD9 or ICD10 code was recorded directly in the dataset and was not generated as a result of hierarchical expansion in ICD9 or ICD10 hierarchy. Can be nested by a PRIMARY command and vice versa.
Returns TI
Example: ORIGINAL(ICD9=E123.22)
    ORIGINAL(PRIMARY(ICD9=E123.22))
    PRIMARY(ORIGINAL(ICD9=E123.22))
Age
    Returns the time interval during which the patient was of a specified age range.
Returns: TI.
Example:
AGE(30 years, 35 years)
    The difference between INTERVAL(30 years, 35 years) and AGE(30 years, 35 years) is that AGE will return only the intervals during which the patient had some event recorded, whereas INTERVAL will construct the intervals regardless of whether there were some events or not.
Boolean Operations
    Boolean operations operate on other boolean operations or basic temporal operations. If boolean operations operate on a mixture of basic temporal operations and boolean operations, appropriate temporal operation is performed first, then evaluation of the boolean operations is performed.
AND
    Performs a boolean AND operation on other boolean operations or returns TRUE if the input is at least one TI.
Returns: BOOLEAN.

Example:
Patient's record:
CPT=1234=1-5
CPT=222=3-7
CPT=2345=2-3
CPT=435=5-7
Query:
AND(CPT=1234, CPT=222,OR(CPT=2345, CPT=435))
Result:
AND(1-5,3-7,OR(2-3,5-7))
AND(true,true,OR(true,true))
AND(true,true)
true
Returns BOOLEAN
OR
    Performs a boolean OR operation on other boolean operations or true if the input is at least one interval.
Returns: BOOLEAN.
Example:
Patient's record:
CPT=222=1-5
CPT=333=2-8
CPT=444=2-4
CPT=555=6-9
Query:
OR(CPT=222, CPT=333,AND(CPT=444, CPT=555))
Result:
OR(1-5,2-8,AND(2-4,6-9))
OR(1-8,AND(true,true))
OR(1-8,true)
OR(true,true)
true
NOT
    Performs a boolean NOT operation on another single boolean operation or returns true if the input is an empty TI.
Returns: BOOLEAN.
Example:
Patient's record:
CPT 3=1-5
CPT 4=10-12
CPT 1=7-11
Query:
NOT(CPT=1)
Result:
false
Example:
Patient's record:
CPT 3=1-5
CPT 4=10-12
CPT 1=7-11
Query:
NOT(AND(CPT=4,CPT=1))
Result:
NOT(AND(true,true))
NOT(true)
false
Identical
    Tests whether two commands are completely identical (returning the same number of intervals having the same starts and ends).
Returns: BOOLEAN.
    The difference between EQUAL and IDENTICAL is that EQUAL returns any intervals of same starts and ends but each command can return intervals not found in the other one.

TI operations operate on TI, if the input is a boolean operation, true is converted to the TI of the whole patient's timeline and false is converted to an empty interval.
Example:
IDENTICAL(INTERVAL(100, 200), UNION(INTERVAL (100, 200), INTERVAL(250, 300)))
Result:
false
TI operations
    TI operations operate on TI, if the input is a boolean operation, true is converted to the TI of the whole patient's timeline and false is converted to an empty interval.
START
    Returns a set of TI with the time coordinates [START, START].
Prerequisites: Performs TI=>CTI
Returns: TP.
Example:
Patient's record:
CPT 3=1-5
Query:
START(CPT=3)
Result:
[1-1]
END
    Returns a set of TI with the time coordinates [END, END]
Prerequisites: Performs TI=>CTI
Returns: TP.
Example:
Patient's record:
CPT 3=1-5
Query:
END(CPT=3)
Result:
[5-5]
COUNT
    Returns a TI for which the number of specified commands was in the specified range. Does not perform computation of intervals before evaluation.
    Command accepts following configurations of parameters:
    COUNT(COMMAND_EVALUATE, MIN, MAX)
    COUNT(COMMAND_EVALUATE, COMMAND_ INTERVAL, TYPE, MIN, MAX)
COMMAND_EVALUATE=Condition in which count we are interested in
MIN/MAX=interval of min/max counts. MIN and MAX values are accepted
COMMAND_INTERVAL=section of patient's timeline for which we want to evaluate the COUNT command
TYPE=SINGLE (a single interval in patient's timeline must have the corresponding counts with double counting)/ALL (cumulative counts for all intervals with no double counting)
Returns: TI.
Example:
COUNT(OR(~TEXT="diabetes", ~TEXT="cancer")), INTERSECT(ICD9=250), ALL, 5, MAX)
    Takes TI for which the patient had ICD9=250 and counts the occurrences of "diabetes" or "cancer" in family history and returns all the ICD9=250 intervals if cumulatively there were at least 5 counts.
INTERVAL(X, Y)
    Given two time points, constructs a TI. If the parameters are TI, all combinations of START of TI1, END of TI2 will be performed for which it is true, that START of TI1<=END of TI2. Interval parameters can be numeric, in which case it constructs an interval from the time points specified.
    Interval command is also compatible with time commands.
Returns: TI.

Example:
Query:
INTERVAL(3 years, 4 years)
Result:
[(3*365*24*60), (4*365*24*60)]
Example:
Patient's record:
CPT 3=1-5
CPT 4=10-12
Query:
INTERVAL(START_OF(CPT=4), END_OF_RECORD)
Result:
INTERVAL(4-4, 12-12)
4-12
INTERVAL(X, Y, PAIRS)
  Evaluates X and Y as a series of pairs.
Returns: TI.
Example:
Query:
INTERVAL(X, Y, PAIRS)
Result:
UNION(INTERVAL(START(X1), START(Y1)), INTERVAL(START(X2), START(Y2)), INTERVAL(START(X3), START(Y3))) for all X1<=Y1 and X2<=Y2 and X3<=Y3 etc.
  Without the PAIRS parameter, the following evaluation is made:
UNION(INTERVAL(START(X1), START(Y1)), INTERVAL(START(X1), START(Y2)),
INTERVAL(START(X1), START(Y3)), INTERVAL (START(X2), START(Y1)),
INTERVAL(START(X2), START(Y2)), INTERVAL (START(X2), START(Y3)), etc.)
INTERSECT
  Returns an intersection of multiple TI. If there is no intersection, returns an empty TI.
Prerequisites: Performs TI=>CTI.
Returns: CTI.
Example:
Patient's record:
CPT 3=1-5
CPT 4=10-12
CPT 1=7-11
Query:
INTERSECT(CPT=1,CPT=4)
Result:
INTERSECT(7-11,10-12)
10-11
Returns CTI
UNION
  Performs a union of multiple TI.
  Prerequisites: Performs TI=>CTI.
Returns: CTI
Example:
Patient's record:
CPT 3=1-5
CPT 4=10-12
CPT 1=7-11
Query:
UNION(CPT=3,CPT=4)
Result:
UNION(1-5,10-12)
1-5,10-12

First Mention
  Returns the first time interval for a given expression (a single TI with the minimum possible start and minimum possible end).
Returns: TI
Example:
Patient's record:
CPT 3=1-5, 10-12
CPT 4=10-12
CPT 1=7-11
Query:
FIRST_MENTION(CPT=3)
Result:
1-5
  First mention can work also in a particular context returning first mention of a term in a particular interval.
Example:
Patient's record:
CPT 2=5-10, 20-30
CPT 3=1-3, 15-22
Query:
FIRST MENTION(CPT=3, CPT=2)/find first mention of CPT3 in CPT 2
Result:
20-22
Last Mention
  Returns the last time interval for a given expression (a single TI with the maximum possible start and maximum possible end).
Returns: TI.
Example:
Patient's record:
CPT 3=1-5, 10-12
CPT 4=10-12
CPT 1=7-11
Query:
LAST_MENTION(CPT=3)
Result:
10-12
  Last mention can work also in a particular context returning last mention of a term in a particular interval.
Example:
Patient's record:
CPT 2=5-10, 20-30
CPT 3=2-8, 31-35
Query:
LAST MENTION(CPT=3, CPT=2) //find first mention of CPT3 in CPT 2
Result:
5-8
EXTEND BY (RESIZE)
  Extends start of an interval by time_start (negative values extend towards past, positive towards future) and end of the interval by time_end. If the intervals overlap after the extension, they will be merged. Intervals that would extend patient's time-line will be truncated so that they are contained in the time line.
Prerequisites: Performs TI=>CTI
Returns: TI
Command accepts following configurations of parameters:
EXTEND BY(TI, time_start, time_end)
Example:
EXTEND BY(TI, 0, START+10)
Example:
EXTEND BY (TI, END−10, 0)

Example:
If the intervals overlap after the extension, they will be merged. Intervals that would extend patient's time-line will be truncated so that they are contained in the time line. Extends start of the interval by time_start (negative towards past, positive towards future) and end of the interval by time_end.
Patient's record:
CPT 3=1-5, 10-12
Query:
EXTEND_BY(CPT=3, −2, 2)
Result:
(1−2)-(5+2),(10−2)-(12+2)
(−1)-(7),(8)-(14)
0-7, 8-12
EVALUATE/EVAL
Parameters: EVALUATE(TYPE, COMMAND)
TYPE:
INTEGER evaluates the first N patients and returns how many were true
TIME returns as many patients as possible in the specified time
CACHED evaluates cached patients only
Example:
EVAL(1000, INTERSECT(ICD9=250.50, ICD9=220.20))
Evaluates first 1000 patients and returns how many of them had and intersection of ICD9=250.50 and ICD9=220.20.
This expression will most likely result in less than 1000 patients, because only 1000 patients are evaluated and out of those 1000 only the ones satisfying the criteria are returned.
Example:
EVAL(10 seconds, INTERSECT(ICD9=250.50, ICD9=220.20))
Spends 10 seconds evaluating the expression gathering as many patients as possible that satisfy the evaluation criteria.
Example:
EVAL(CACHED, INTERSECT(ICD9=250.50, ICD9=220.20))
If the server could not load all the patients into memory (size of the memory is smaller than required), EVAL command evaluates only the patients that are physically located in the memory and will not load any patients from the disk.
LIMIT
Parameters: LIMIT(TYPE, COMMAND)
TYPE:
INTEGER returns the specified number of patients LIMIT (1000, ICD9=200.00)=>
returns first 1000 pids
TIME returns as many patients as possible in the specified time
CACHED evaluates cached patients only
Example:
LIMIT(1000, ICD9=250.50)
Keep evaluating patients until there are 1000 patients that satisfy the criteria. Stop the evaluation and return the 1000 patients.
LIMIT(10 seconds, ICD9=250.50)
Identical command to EVAL(10 seconds, ICD9=250.50). Spends 10 seconds evaluating and returns all the patients that satisfied criteria
LIMIT(CACHED, ICD9=250.50)
Identical to EVAL(CACHED, ICD9=250.50). Evaluates only the patients physically stored in memory and will not load any patients from the disk.

ESTIMATE
Parameters: ESTIMATE(TYPE, COMMAND)
Only returns the positively evaluated PIDs. Estimates the total cohort statistics based on evaluated pids.
TYPE:
INTEGER returns the specified number of patients ESTIMATE(1000, ICD9=200.00)=>returns first 1000 pids
TIME returns as many patients as possible in the specified time
CACHED evaluates cached patients only
Example:
ESTIMATE(1000, ICD9=250.50)
Evaluates as many patients as necessary to identify 1000 patients that satisfy criteria. Based on the ratio of patients that that satisfied criteria to total patients evaluated estimates how many patients would satisfy the criteria if all the patients were evaluated.
Example:
ESTIMATE(10 seconds, ICD=250.50)
Evaluates for 10 seconds and calculates ratio of patients that satisfy criteria to total patients evaluated estimates how many patients would be returned should the query evaluate every patient in the database.
Example:
ESTIMATE(CACHED. ICD9=250.50)
Evaluates all the patients physically located in memory and estimates how many patients would satisfy the criteria should all the patients be evaluated.
EQUAL
Returns only the time intervals that have the same starts and ends.
Returns: TI.
Parameters: EQUAL(TI1, TI2)
Example:
EQUAL(CPT=1111, CPT=1222)
Example:
EQUAL(INTERVAL(100, 200), UNION(INTERVAL(100, 200), INTERVAL(250, 300)))
Result:
[100, 200]
BEFORE (SEQUENCE)
Finds time intervals that occur in the temporal order specified by the command, and returns the time intervals specified in the command.
Prerequisites: Performs TI=>CTI
Returns: TI.
Command accepts following configurations of parameters:
BEFORE(TI1, TI2*)
Looks for TI1 before TI2
Asterisk denotes which parameter to return if evaluation is successful
Looks for TI1 before TI2. Can be followed by multiple parameters
When no asterisk is specified and no return type is specified in other parameters, command cannot be executed.
BEFORE(TI1, TI2)+>(−100, −1)-*<>(END+1, END+100)
plus (+) sign before a parameter means that the TI1 has to occur in that range. If the TI1 does not exist, then the TI2 for which we evaluate will fail.
minus (−) sign before a parameter means that the TI1 cannot occur in that range. If TI1 occurs, then the TI2 for which we evaluate will fail.

To return the range of the condition (−100, −1), asterisk needs to be added before the range:
BEFORE(TI1, TI2)+*(−100, −1)

This command returns the range of (−100, −1) before the TI2, if TI1 was located in that range.

If parameters start with <TI1 had to begin in the specified range, if >TI1 had to end in that range, if < > same TI1 had to both start and end in the interval (contained by the interval).

The time range parameter+(100, 200) is always evaluated based on the TI2, so BEFORE(TI1, TI2)+(100, 200) will take the TI2, extend the START of TI2 by 100 towards the future, extend the END by 200 into the future and evaluates whether there is TI1 in that range.

BEFORE(X, X) is not a valid command since TI computation takes place in BEFORE command.
Example:
Patient's record:
X1=[5, 5]
Y1=[10, 20]
Y2=[35, 40]
Query:
BEFORE(X, Y)*−(−6, −1)
Result:
[29, 39]

As we can see parameter *−(−6, −1) is false for Y1 (X1 is within the specified range even though it should not be), but is true for Y2.
Query:
BEFORE(X, Y*)−(−6, −1)
Result:
[35, 40]

Y2 is returned since it is evaluated to true even though Y1 was evaluated to false.

If we want to return only the intervals for which it is true that they were ALWAYS in a certain range before Y (there is no instance of X that was not in the range), we should use:
A=BEFORE(X, Y)+*(R1, R2)
B=BEFORE(X, Y)*(R1, R2)
INTERSECT(NOT($B), $A)

If there is at least one interval X that is not in range R1, R2, nothing will be returned.
Example:
Patient's record:
Y1=[10, 20]
Y2=[30, 40]
X1=[25, 27]
Query:
var A=BEFORE(X, Y)+*(MIN, −1)
Result:
[25, 27]
Query:
var B=BEFORE(X, Y)−*(MIN, −1)
Result:
[0, 9]
Query:
INTERSECT(NOT($B), $A)
Result:
[ ]

BEFORE STRUCTURE

Before command can be invoked in the following structure:
(X) BEFORE Y*
returns every Y which exists at least one minute after the start of X
(X*) BEFORE Y
returns every X which exists at least 1 minute before the start of Y
(X AND Y AND Z) BEFORE A*
returns every A that has at least 1 minute before its start at least 1 minute of X, Y and Z
(X* AND Y AND Z*) BEFORE A
returns every X, Z for which it's true that it exists before a start of A
(X) AND NO (Y) BEFORE A*
returns A that has X and no Y before its start
(X*) AND NO (Y) BEFORE A
returns X that exists before A and where there is no Y before A
(X AND Y) AND NO (Z AND B) 3 MONTHS* BEFORE A
returns 3 months before A for which it is true that there was a X and Y but no Z and B Note that it is not possible to return any data points from the negative mentions NO ( . . . ). Otherwise it is possible to tag any elements of the expression including the time element.

AFTER STRUCTURE

After command can be invoked in the same structure as BEFORE with the same syntax, except that the keyword AFTER is used.

DURATION

Returns a TI for which the duration of specified commands was in the specified range.
Prerequisite: Performs TI=>CTI
Command accepts following configurations of parameters:
DURATION(COMMAND_EVALUATE, TYPE, MIN, MAX)
DURATION(COMMAND_EVALUATE, COMMAND_INTERVAL, TYPE, MIN, MAX)
COMMAND_EVALUATE=Condition in which duration we are interested in
MIN/MAX=interval of min/max counts. MIN and MAX values are accepted
COMMAND_INTERVAL=section of patient's timeline for which we want to evaluate the DURATION command. Each time interval in the section is evaluated separately and then next time interval is iterated and evaluated. ALL operator in this case will return if the patient had at desired durations cumulatively WITHIN the single time interval specified by the command.
TYPE=SINGLE (a single interval in patient's timeline must have the corresponding durations—double counting is permissible)/ALL (cumulative durations for all intervals—double counting is not permissible)
Example:
DURATION(OR(~TEXT="diabetes", ~TEXT="cancer")), INTERSECT(ICD9=250), 5, MAX, ALL)

Takes TI for which the patient had ICD9=250 and counts the durations of "diabetes" or "cancer" in family history and returns all the ICD9=250 intervals if cumulatively there were at least 5 minutes.
Example:
DURATION(CPT=25000, CPT=45000, SINGLE, 0, 1)

If the CPT=25000 intersects the CPT=45000 at least at one point, and if the whole length of the CPT=25000 interval is greater than 1, returns it. If there are multiple CPT=25000 within a single CPT=45000, all of them will be returned.

INVERT

Inverts a TI or TP by using patient's time line as a reference. Inversion of an empty interval is patient's complete interval.

Prerequisites: Performs TI=>CTI
Returns: CTI.
Example:
Patient's record: CPT 3=[1-3], [7-10]
   CPT 2=[ ]
   CPT 4=[5-8]
Query:
INVERT(CPT=2)
Result:
[1-10]
Query:
INVERT(INTERVAL(START_OF_RECORD, FIRST_MENTION(CPT=4))
(This is equivalent to no history of.)
Result:
INVERT([1-5])
[6-10]
Macro Expressions
   Macro expressions are sets of expression encapsulating common expression for convenience sake
RECORD START
START(TIMELINE)
RECORD END
END(TIMELINE)
History of (X)
   Patient had a history of X. Returns TI from the first mention of X until the end of record. If patient never had X, empty interval will be returned.
Returns: TI.
Example:
INTERVAL(START(FIRST MENTION(X)), RECORD END)
No History of (X)
   Patient did not have a history of X. This will return a TI of the whole patient's time line if the patient never had X, or an interval from the beginning of the patient's time line to the development of X.
Returns: TI.
Example:
UNION(NOT(X), INVERT(HISTORY_OF(X)))
CONTAINS(X*, Y*)
   Finds Y that are fully contained in X. Asterisk denotes which parameter to return if evaluation is successful.
Equivalent BEFORE command: BEFORE(Y, X)+*< > (START, END)
   CONTAINS(X, X) is invalid as there is computation of TI in BEFORE command. This means that if multiple X intervals intersect at any point, they will be computed (merged) and it is impossible to establish any temporal relation.
Return X Intersecting Y
   Returns full interval X if it intersects Y.
Equivalent BEFORE command: BEFORE(Y, X*)+(START, END)
Return X Intersecting any (A, B, C)
   Returns full interval X if it intersects at any point any of A, B, or C.
Equivalent BEFORE command: BEFORE(UNION(A, B, C), X*)+(START, END)
Return X Intersecting all (A, B, C)
   Returns full interval X if it intersects at any point all of A, B, and C. The intervals A, B, C do not have to intersect each other, but they have to intersect X
Equivalent command sequence:
var 1=BEFORE(A, X*)+(START, END)
var 2=BEFORE(B, X*)+(START, END)
var 3=BEFORE(C, X*)+(START, END)
var 4=INTERSECT(X, $1, $2, $3)
Return X Always Intersecting Y
   Returns full interval X if in patient's timeline all X intervals intersect Y
Equivalent command sequence:
var 1=BEFORE(Y, X*)−(START, END)
var 2=NOT($1)
var 3=INTERSECT(X, $2)
Return X Always Intersecting any (A, B, C)
   Returns full interval X only if every X interval in patient's timeline intersects at some point A, B or C.
Equivalent command sequence:
var 1=BEFORE(UNION(A, B, C), X*)−(START, END)
var 2=NOT ($1)
var 3=INTERSECT($2, X)
Return X Always Intersecting all (a, B, C)
   Returns full interval X if every X in patient's timeline always intersects A, B and C
Equivalent command sequence:
var 1=BEFORE(A, X*)−(START, END)
var 2=BEFORE(B, X*)−(START, END)
var 3=BEFORE(C, X*)−(START, END)
var 4=INTERSECT($1, $2, $3)
var 5=NOT ($4)
var 6=INTERSECT($5, X)
Return X not Intersecting Y
   Returns full interval X if it does not intersect Y.
Equivalent BEFORE command:
BEFORE(Y, X*)−(START, END)
Return X not Intersecting any (A, B, C)
   Returns full interval X if it does not intersect A, B or C. Intervals intersecting either A, B, or C will be removed.
Equivalent BEFORE command:
BEFORE(UNION(A, B, C), X*)−(START, END)
Return X not Intersecting all (a, B, C)
   Returns full interval X if it does not intersect A, B and C.
Equivalent command sequence:
var 1=BEFORE(A, X*)+(START, END)
var 2=BEFORE(B, X*)+(START, END)
var 3=BEFORE(C, X*)+(START, END)
var 4=INTERSECT($1, $2, $3)
var 5=INVERT($4)
var 6=INTERSECT(X, $5)
Return X Never Intersecting Y
   Returns full interval X if it does not intersect Y.
Equivalent command sequence:
var 1=BEFORE(Y, X*)+(START, END)
var 2=NOT ($1)
var 3=INTERSECT(X, $2)
Return X Never Intersecting any (A, B, C)
   Returns full interval X if it never intersected in patient's timeline A, B or C.
Equivalent command sequence:
var 1=BEFORE(A, X*)+(START, END)
var 2=BEFORE(B, X*)+(START, END)
var 3=BEFORE(C, X*)+(START, END)
var 4=UNION($1, $2, $3)
var 5=NOT($4)
var 6=INTERSECT($5, X)
Return X Never Intersecting all (a, B, C)
   Returns full interval X if it is true that in patient's timeline it never intersected all of A, B, and C.
Equivalent command sequence:
var 1=BEFORE(A, X*)+(START, END)
var 2=BEFORE(B, X*)+(START, END)
var 3=BEFORE(C, X*)+(START, END)

var 4=INTERSECT($1, $2, $3)
var 5=NOT($4)
var 6=INTERSECT(X, $5)
NEVER HAD(X)
 Patient never had a condition X. Returns patient's whole time line (true) if he never had X or an empty interval/false if he had.
NOT(HAS(X))
EVENT FLOW (X)
 Exports the current cohort into an EventFlow/CoCo file formats.
OUTPUT (X)
 When generating the list of PIDs in the export, the PID information will also contain time intervals for when the evaluated query was true in format PID [TAB] START_TIME [TAB] END_TIME
CSV
Generates a CSV file with specified list of columns.
CSV(COHORT=INTERSECT(ICD9=250.00, CPT=24560), METFORMIN=AND(RX=1235), DEATH TIME=DEATH)
Example:
CSV(COHORT=ICD9=250.00, SURGERY=CPT=22456)
Cohort Operations
SAME
 Returns list of patients that are in both compared cohorts.
Example:
var cohort1=INTERSECT(ICD9=250.0, NOTES)
var cohort2=AND(GENDER="MALE", RACE="WHITE")
SAME($cohort1, $cohort2)
DIFF
 Returns list of patients that are not represented in both cohorts.
Example:
var cohort1=INTERSECT(ICD9=250.0, NOTES)
var cohort2=AND(GENDER="MALE", RACE="WHITE")
DIFF($cohort1, $cohort2)
MERGE
 Returns list of patients added from both cohorts.
Example:
var cohort1=INTERSECT(ICD9=250.0, NOTES)
var cohort2=AND(GENDER="MALE", RACE="WHITE")
MERGE($cohort1, $cohort2)

Iterative Evaluation
 To evaluate each time interval in a query separately, iterative evaluation can be used. Examples where iterative evaluation allows operations that cannot be done in regular approach.

```
FOR EACH (COMMAND) AS (LABEL_MAIN) {
}
```

Takes each time interval from the command COMMAND and makes it accessible in a for loop as LABEL_MAIN
Example:

```
FOR EACH (INTERSECT(ICD9=250.50, CPT=25000)) AS (DIABETES) {
   RETURN DIABETES AS VARIABLE_1;
}
INTERSECT(VARIABLE_1, GENDER="MALE")
```

Takes each interval from the intersection of both codes, makes it available in a for loop under the name DIABETES. There is no algorithm in place so it just returns all the results as VARIABLE_1. VARIABLE_1 is then accessible in the global context and can be evaluated.
Commands available in the loop:
LABEL=COMMAND;
CONTINUE;
EXIT;
FAIL PATIENT;
CLEAR GLOBAL_LABEL;
RETURN LABEL AS GLOBAL_LABEL;
IF EMPTY (COMMAND) { . . . }
IF !EMPTY (COMMAND) { . . . }
IF (COMMAND1)==(COMMAND2) { . . . }
IF (COMMAND1) !=(COMMAND2) { . . . }
IF (COMMAND1) IN (COMMAND2) { . . . }
IF (COMMAND1) !IN (COMMAND2) { . . . }
LABEL=COMMAND;
 Stores the result of the command into a variable accessible by the label name in the current for each loop context. Variable is not accessible in a nested for each context and is not accessible in global context. This command can be used to reassign previously assigned variable as well as global variable.
 At the end of each loop, all local variables are deleted. The persistence of local variables is only within a single loop cycle.
 To store value persistently use the RETURN command.
Example:

```
FOR EACH (ICD9=250.50) AS (DIABETES) {
   LONGER_THAN_3_YEARS = DURATION(DIABETES, SINGLE, 3 YEARS, MAX);
   RETURN LONGER_THAN_3_YEARS AS RESULT_1;
}
RESULT_1
```

CONTINUE;
Skips the rest of the FOR EACH loop.
Example:

```
FOR EACH (ICD9=250.50) AS (DIABETES) {
   LONGER_THAN_3_YEARS = DURATION(DIABETES, SINGLE, 3 YEARS, MAX);
   // skips intervals shorter than 3 years
   IF EMPTY(LONGER_THAN_3_YEARS) {
     CONTINUE;
   }
}
```

```
// return command is skipped for shorter ones
   RETURN DIABETES AS RESULT_1;
}
RESULT_1
```

EXIT;
Stops evaluation of the FOR EACH loop and exits. All the results stored in the global variable before the exit will be returned.
Example:

```
FOR EACH (ICD9=250.50) AS (DIABETES) {
   LONGER_THAN_3_YEARS = DURATION(DIABETES, SINGLE, 3 YEARS, MAX);
   // returns only those instances that are longer than 3 years and followed by the first shorter instance
   IF EMPTY(LONGER_THAN_3_YEARS) {
      EXIT;
   }
   RETURN DIABETES AS RESULT_1;
}
RESULT_1
```

FAIL PATIENT;
Stops evaluation of the FOR EACH loop and causes the patient's evaluation to be FALSE (empty interval).
Example:

```
FOR EACH (ICD9=250.50) AS (DIABETES) {
   LONGER_THAN_3_YEARS = DURATION(DIABETES, SINGLE, 3 YEARS, MAX);
   // returns only those patients which had all their durations longer than 3 years
   IF EMPTY(LONGER_THAN_3_YEARS) {
      FAIL PATIENT;
   }
   RETURN DIABETES AS RESULT_1;
}
RESULT_1
```

Returns only the patients which did not have any ICD9=250.50 codes shorter than 3 years.
RETURN LABEL AS GLOBAL_LABEL;

Takes a variable or a command and stores the resulting value into the global context (if FOR EACH is nested in another FOR EACH command, returned nested variable will be stored in the parent context.
Example:

```
FOR EACH (ICD9=250.50) AS (DIABETES) {
   A = INTERSECT(CPT=250000, DIABETES);
   FOR EACH (A) AS (NESTED_A) {
      B = DURATION(NESTED_A, SINGLE, 3 YEARS, MAX);
      IF NOT EMPTY(B) {
         RETURN B AS GLOBAL_B;
      }
   }
   // GLOBAL_B is accessible within this context since it was returned by the nested
FOR EACH loop
   RETURN GLOBAL_B AS RESULT_1;
}
// RESULT_1 is available in global context since it was returned by the parent FOR EACH
RESULT_1
```

CLEAR GLOBAL_LABEL;
Clears the contents of the global variable.
Example:

```
FOR EACH (ICD9=250.50) AS (DIABETES) {
   A = INTERSECT(CPT=250000, DIABETES);
   FOR EACH (A) AS (NESTED_A) {
      B = DURATION(NESTED_A, SINGLE, 3 YEARS, MAX);
      IF NOT EMPTY(B) {
         RETURN B AS GLOBAL_B;
      }
      IF EMPTY(B) {
         CLEAR GLOBAL_B;
         EXIT;
      }
   }
}
// GLOBAL_B is incrementally receiving values from each iteration unless
B is empty which clears all the
// previous results and exits the loop
GLOBAL_B
```

IF EMPTY (COMMAND) { ... }
Executes commands in curly braces if the command evaluates to an empty interval.

IF !EMPTY (COMMAND) { ... }
Executes commands in curly braces if the command evaluates to an non empty interval.

IF (COMMAND1)==(COMMAND2) { . . . }
    Executes commands in curly braces if the command1 time intervals equal command2 time intervals
IF (COMMAND1) !=(COMMAND2) { . . . }
    Executes commands in curly braces if the command1 time intervals are not equal to command2 time intervals
Text Field Limitations
    Whenever using the text fields (for example: TEXT= "something", ATC="something"), the text field between the quotation marks can contain any character, except for quotation mark character and a dollar sign. These are reserved for the internal use in the language.

While particular embodiments and applications of the present invention have been illustrated and described herein, it is to be understood that the invention is not limited to the precise construction and components disclosed herein and that various modifications, changes, and variations may be made in the arrangement, operation, and details of the methods and apparatuses of the present invention without departing from the spirit and scope of the invention.

What is claimed is:

1. A computer-implemented method for data analysis, comprising:
    receiving, for each of a plurality of patients, unstructured medical information for the patient from a plurality of different sources of medical information and generating a data object for the patient using a plurality of different models that provide structure for processing the unstructured medical information for the different sources of medical information;
    selecting a data type for at least one data object in a plurality of data objects that is optimal for encoding the unstructured information into the at least one data object based on properties of the at least one data object, wherein the at least one data object comprises at least one header and a plurality of data components, wherein the at least one header comprises information regarding the selected data type and memory mappings of the plurality of data components within a body of the at least one data object;
    encoding the unstructured information in the at least one data object of the selected data type, wherein the unstructured information is encoded within the plurality of data components in a serialized in-memory byte-stream format;
    receiving a search query to analyze patient medical data with a plurality of parameters related to a plurality of data components for a plurality of patient demographics;
    determining a particular data component relevant to the search query; and
    retrieving a data value directly from the particular data component of the at least one data object using the header of the at least one data object to identify a memory location of the particular data component and without deserialization of the at least one data object, wherein the data value is retrieved in a serialized in-memory byte-stream format; and
    generating an identification of a cohort of patients for the search query that includes the data value.

2. The method of claim 1, wherein serialization comprises translating data objects into a byte-stream format for storage in memory and deserialization comprises extracting a data structure from a series of bytes.

3. The method of claim 1, wherein selecting the data type for the at least one data object comprises minimizing a number of bytes used to store the data object.

4. The method of claim 2, wherein selecting the data type for the at least one data object is based on a total byte size of the data object and wherein different data objects have different data types.

5. The method of claim 1, wherein information regarding the data type of the at least one data object is stored within the header of the at least one data object.

6. The method of claim 1, wherein different data objects have different sets of data components, and wherein the at least one header of the at least one data object identifies a series of data components available for the at least one data object.

7. The method of claim 6, wherein the at least one header comprises an offset encoding and an offset for each of the plurality of data components of the at least one data object.

8. The method of claim 7, wherein the offset encoding specifies the encoding type used to store the offset for each of the plurality of data components.

9. The method of claim 8, wherein an offset of a particular data component of a particular data object provides a number of bytes between a start of the particular data component in the particular data object body and a start of the particular data object in memory.

10. The method of claim 1, further comprising allocating a first set of data objects from the plurality of data objects to off-heap memory and a second different set of data objects as on-disk shards, wherein an optimal shard size is determined based on a size of the data set.

11. The method of claim 1, further comprising storing the plurality of data objects in a master-slave configuration that allows parallel processing of the data objects stored at different locations, wherein the master stores a first set of data objects and corresponding indices and statistics and the slave stores a remaining second set of data objects and corresponding indices and statistics.

12. The method of claim 1, further comprising generating a data index mapping the plurality of data objects to on-disk shards storing the plurality of data objects.

13. The method of claim 1, further comprising generating a memory index that maps each data object in the plurality of data objects to a memory space for fast data retrieval.

14. The method of claim 1, further comprising processing the unstructured information using a plurality of data models that determine how to store the unstructured information in the at least one data object.

15. The method of claim 1, wherein the plurality of data components have a plurality of different types, wherein a data component from the plurality of data components is at least one type selected from the group consisting of a hashmap, a list, a measured value list, a computed value list.

16. The method of claim 15, wherein a measured value list type data component comprises a set of values and corresponding times for the values.

17. The method of claim 1, wherein the at least one data object is stored in a continuous memory byte range.

18. The method of claim 1, further comprising:
    receiving a search query in a plurality of dimensions including space and time;
    analyzing headers of the plurality of data objects to identify a set of data objects relevant to the search query; and
    identifying memory locations of values relevant to the search query based on the headers of the set of data objects.

* * * * *